(12) United States Patent
Nodomi et al.

(10) Patent No.: US 7,434,023 B2
(45) Date of Patent: Oct. 7, 2008

(54) MEMORY DEVICE

(75) Inventors: Akira Nodomi, Kawasaki (JP); Yoshimasa Takebe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 231 days.

(21) Appl. No.: 11/271,913

(22) Filed: Nov. 14, 2005

(65) Prior Publication Data

US 2007/0028071 A1    Feb. 1, 2007

(30) Foreign Application Priority Data

Jul. 27, 2005    (JP) .............................. 2005-216621

(51) Int. Cl.
  *G06F 9/22*    (2006.01)
  *G06F 9/30*    (2006.01)
(52) U.S. Cl. ............................. 711/202; 710/52; 710/56
(58) Field of Classification Search ................ 711/202, 711/203
  See application file for complete search history.

(56) References Cited

U.S. PATENT DOCUMENTS 5,678,035 A * 10/1997 Takebe ........................ 345/554
6,622,182 B1 * 9/2003 Miller et al. ................... 710/29
6,760,792 B1 * 7/2004 Askar ........................... 710/52
7,079,533 B1 * 7/2006 Erimli et al. ................ 370/389

FOREIGN PATENT DOCUMENTS

JP        09-319657        12/1997

* cited by examiner

*Primary Examiner*—Kevin Ellis
*Assistant Examiner*—Hamdy S Ahmed
(74) *Attorney, Agent, or Firm*—Arent Fox LLP

(57) ABSTRACT

A memory device that can handle various transmission-source devices and transmission-destination devices without modifying the hardware configuration. The memory device is used to transmit and receive data, and includes a data buffer for storing data output from a data-transmission source and outputting the data to a data-transmission destination serving as the data output destination; a transmission-source address converter for performing arrangement processing on the data output from the data-transmission source when the data-transmission source is a device that passively outputs data; and a transmission-destination address converter for performing arrangement processing on the data to be input to the data-transmission destination when the data-transmission destination is a device to which data is passively input.

12 Claims, 21 Drawing Sheets

| | INPUT SIDE | OUTPUT SIDE | INPUT-ADDRESS CONVERTER | OUTPUT-ADDRESS CONVERTER | TRANSFER MODE | DATA-BUFFER ACCESS MODE |
|---|---|---|---|---|---|---|
| CONFIGURATION 1 | CPU 101 | MEMORY 104 | × | ○ | ○ | A,B,C,E |
| CONFIGURATION 2 | MEMORY 103 | CPU 102 | ○ | × | ○ | A,B,D,E |
| CONFIGURATION 3 | CPU 101 | CPU 102 | × | × | – | A,B,C,D,E |
| CONFIGURATION 4 | CPU 101 | CPU 101 | × | × | – | A,B,C,D,E |
| CONFIGURATION 5 | MEMORY 103 | MEMORY 104 | ○ | ○ | ○ | A |
| CONFIGURATION 6 | MEMORY 103 | MEMORY 103 | ○ | ○ | ○ | A |

FIG. 7

MEMORY DEVICE

CROSS-REFERENCE TO RELATED APPLICATIONS

This application is based upon and claims the benefits of priority from the prior Japanese Patent Application No. 2005-216621, filed on Jul. 27, 2005, the entire contents of which are incorporated herein by reference.

BACKGROUND OF THE INVENTION

1. Field of the Invention

The present invention relates to memory devices, and more particularly, to a memory device that performs transmission and reception of data.

2. Description of the Related Art

In current computer systems and other devices, various buffers are used to perform data transmission and reception.

For example, a known device for transferring data inside a single central processing unit (CPU) is a stack memory, which is used as an area for temporarily saving data such as register data and the like due to interrupts and function calls. In general, the stack memory is implemented using a stack pointer on a standard one-dimensional memory.

A known device for transferring data between different CPUs is a shared memory having a software-based interface.

A known device for transferring data between a CPU and a memory is a cache memory.

Cache memories are data buffers with a relatively high degree of versatility since hardware control is performed, and there is no need for software that takes the hardware configuration into account. Also, because data swapping is automatically performed by hardware in cache memories, there is an advantage in that, regarding software-based data access, data swapping is seamless.

However, because cache memories are restricted to data transfer in units equal to the cache line size, they are inefficient at handling discrete data. In addition, because they were originally based on technology employing temporal and spatial locality of data access, they suffer from the problem that the cache capacity is wastefully used up when accessing data that is not reusable (that is, a part of the cache memories is meaninglessly occupied), and the performance is therefore reduced. They also suffer from the problem that the cache capacity significantly affects the computational performance of the CPU.

There is a known storage device provided with a stream buffer, combined with a cache memory, that can perform buffering without wastefully using up the capacity of the cache (that is, without occupying a part of the cache memory meaninglessly), even for data that is not reusable (for example, see Japanese Unexamined Patent Publication No. 09-319657).

However, stack memories and shared memories must be provided with dedicated hardware and software frameworks and therefore suffer from poor versatility. Moreover, the storage device described in Japanese Unexamined Patent Publication No. 09-319657 can be used only for transmitting and receiving data between a CPU and a memory, but it is difficult to use it in other configurations.

To summarize the above, hardware constituting conventional data transmitting-and-receiving devices must be appropriately modified to match the device(s) to be controlled (CPU and/or memory) for performing data transmission and reception. In other words, there is presently no suitable framework that can provide a unified infrastructure for any type of data communication.

SUMMARY OF THE INVENTION

The present invention has been conceived in light of the problems described above, and it is an object thereof to provide a memory device that can handle various transmission-source devices and transmission-destination devices without modifying the hardware configuration.

In order to realize the object mentioned above, a memory device for use in transmitting and receiving data is provided. This memory device includes a data buffer for storing data output from a data-transmission source and outputting the data to a data-transmission destination serving as an output destination for the data; a transmission-source address converter for performing arrangement processing on the data output from the data-transmission source when the data-transmission source is a device that passively outputs data; and a transmission-destination address converter for performing arrangement processing on the data to be input to the data-transmission destination when the data-transmission destination is a device to which data is passively input.

The above and other objects, features and advantages of the present invention will become apparent from the following description when taken in conjunction with the accompanying drawings, which illustrate preferred embodiments of the present invention by way of example.

BRIEF DESCRIPTION OF THE DRAWINGS

FIG. 7 is a table showing six configurations of the data transmitting-and-receiving system.

DESCRIPTION OF THE PREFERRED EMBODIMENT

An embodiment of the present invention will be described below with reference to the drawings.

Figure 1:
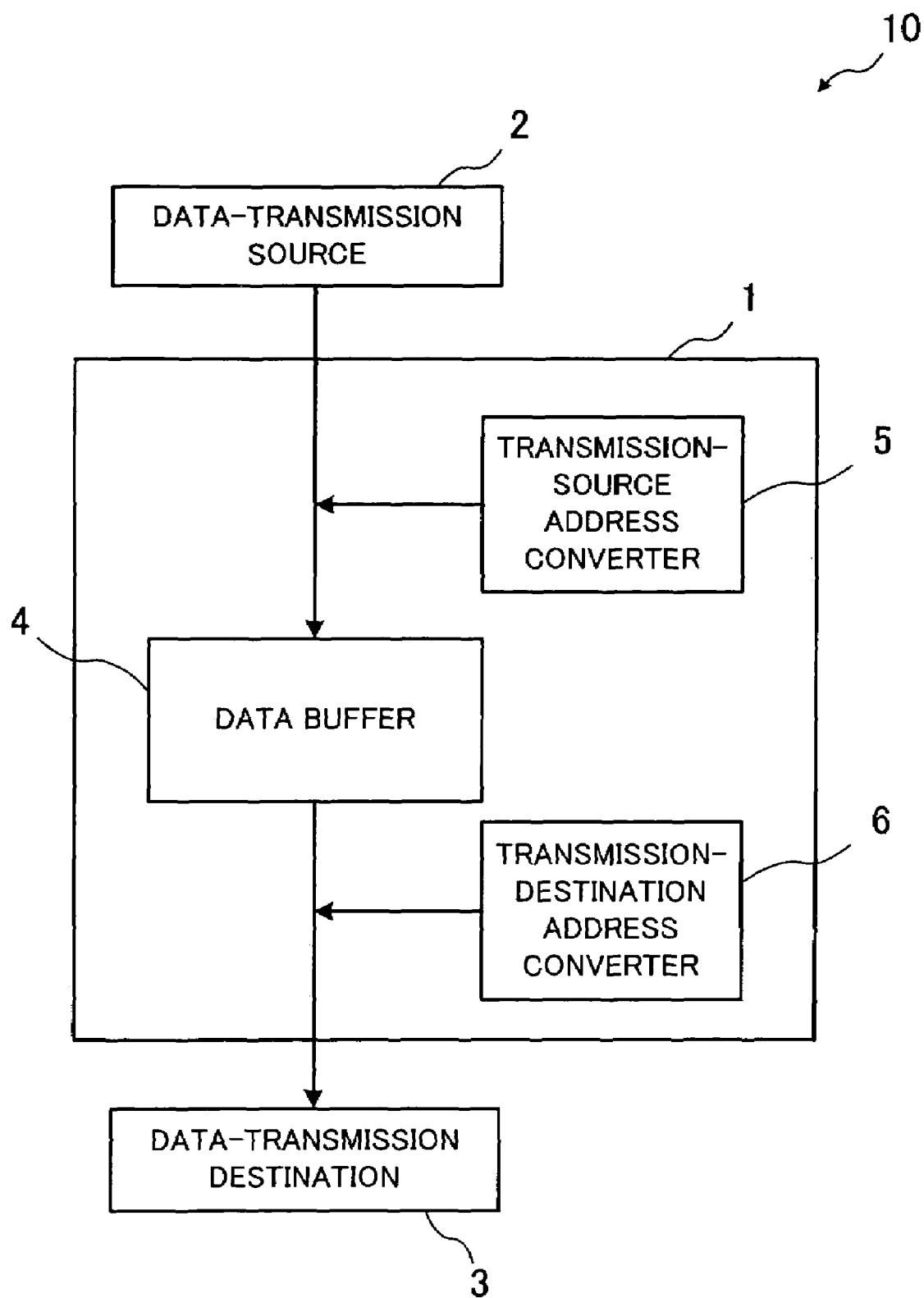
FIG. 1 is a diagram showing the basic outline of the present invention.

FIG. 1 shows the basic outline of the present invention.

A data transmitting-and-receiving system 10 includes a memory device 1, a data-transmission source 2, and a data-transmission destination 3.

The memory device 1 includes a data buffer 4, a transmission-source address converter 5, and a transmission-destination address converter 6.

The data buffer 4 stores data output from the data-transmission source 2 and outputs data to the data-transmission destination 3, which is the output destination of the data.

When the data-transmission source 2 is a device that passively outputs data, that is, when the data-transmission source 2 outputs data to the data buffer 4 only if the data-transmission source 2 receives an external data-output command, the transmission-source address converter 5 performs arrangement processing on the data output from the data-transmission source 2 to the data buffer 4.

When the data-transmission destination 3 is a device to which data is passively input, that is, when the data is input to the data-transmission destination 3 from the data buffer 4 only if the data-transmission destination 3 receives an external data-input command, the transmission-destination-address converter 6 performs arrangement processing on the data output from the data buffer 4 to the data-transmission destination 3.

An embodiment of the present invention will be described below with reference to the drawings.

Figure 2:
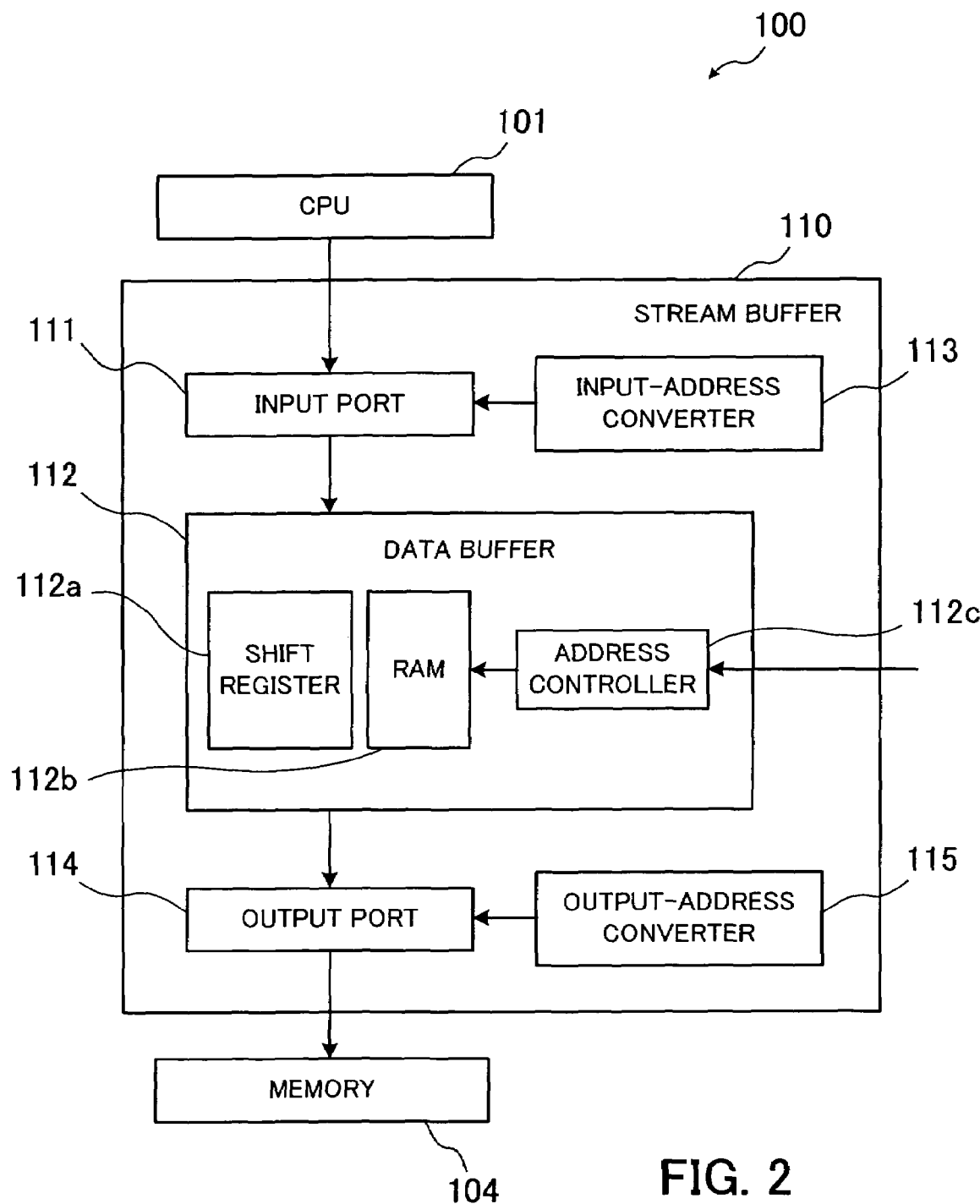
FIG. 2 is a block diagram showing a data transmitting-and-receiving system.

FIG. 2 is a block diagram showing a data transmitting-and-receiving system 100.

In the data transmitting-and-receiving system 100, a CPU 101 or a memory 103 is selected as a data-transmission source which inputs data to a stream buffer (memory device) 110, and one of the CPU 101, a CPU 102, the memory 103, and a memory 104 is selected for use as the data-transmission destination to which data is output from the stream buffer 110.

For example, in FIG. 2, the CPU 101 is selected as the data-transmission source, and the memory 104 is selected as the data-transmission destination.

The stream buffer 110 includes an input port 111 that is connected to the CPU 101; a data buffer 112 having a shift register 112a and a random access memory (RAM) 112b for buffering the data input at the input port 111 and an address controller 112c that specifies read and write locations of the data buffered in the RAM 112b as required; an input-address converter 113 that can output the data input from the input port 111 to the data buffer 112 (the data transferred to the data buffer 112) at a desired timing, as required; an output port 114 that is connected to the memory 104; and an output-address converter 115 that can output the data output from the data buffer 112 to the memory 104 (the data transferred to the memory 104) at a desired timing, as required.

The data output from the input port 111 is input to the shift register 112a or the RAM 112b according to data-buffer access mode options A to F, described later (that is, the shift register 112a or the RAM 112b is selected).

Next, the configuration of each part in the stream buffer 110 will be described.

Figure 3:
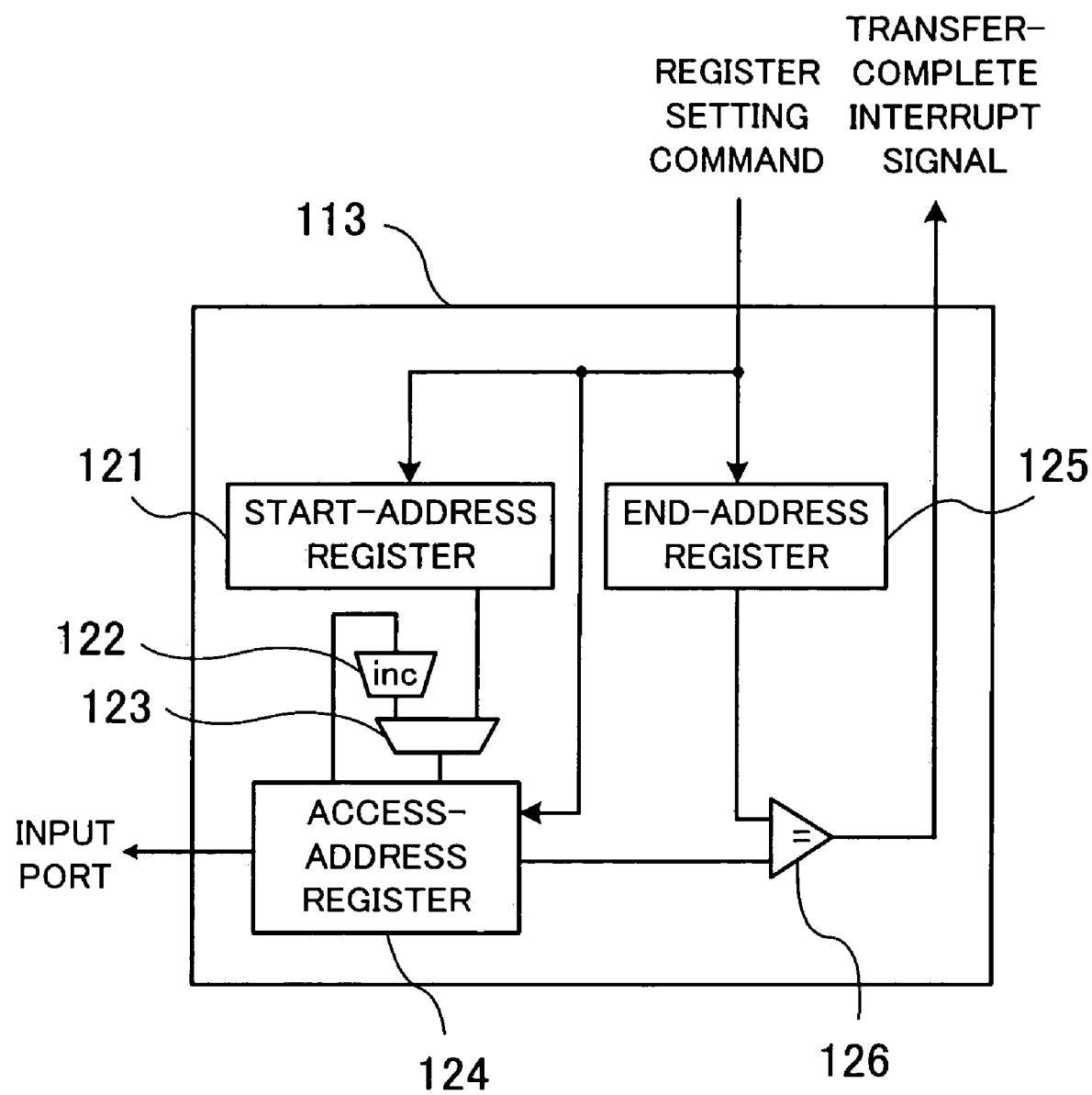
FIG. 3 is a block diagram showing the internal configuration of an input-address converter.

FIG. 3 is a block diagram showing the internal configuration of the input-address converter 113.

The input-address converter 113 includes a start-address register 121, a counter 122, an ALU 123, an access-address register 124, an end-address register 125, and a comparator 126.

The input-address converter 113 begins to operate when a register setting command (described later) is input.

The start-address register 121 indicates a start address for data transfer to the data buffer 112 and outputs the start address to the ALU 123 when the register setting command is input thereto.

The counter 122 increments a count value for each access to the access-address register 124 and outputs the count value to the ALU 123.

The ALU 123 adds the count value in the counter 122 to the start address output from the start-address register 121 and outputs the result to the access-address register 124.

When there is an output from the ALU 123, the access-address register 124 outputs the value of the access-address register 124 to the input port 111 and outputs the count value to the comparator 126.

The end-address register 125 stores the final address for the data transfer to the data buffer 112.

The comparator 126 compares the value in the access-address register 124 and the value in the end-address register 125 and, when they are equal, outputs a transfer-complete interrupt signal indicating completion of the data transfer.

Figure 4:
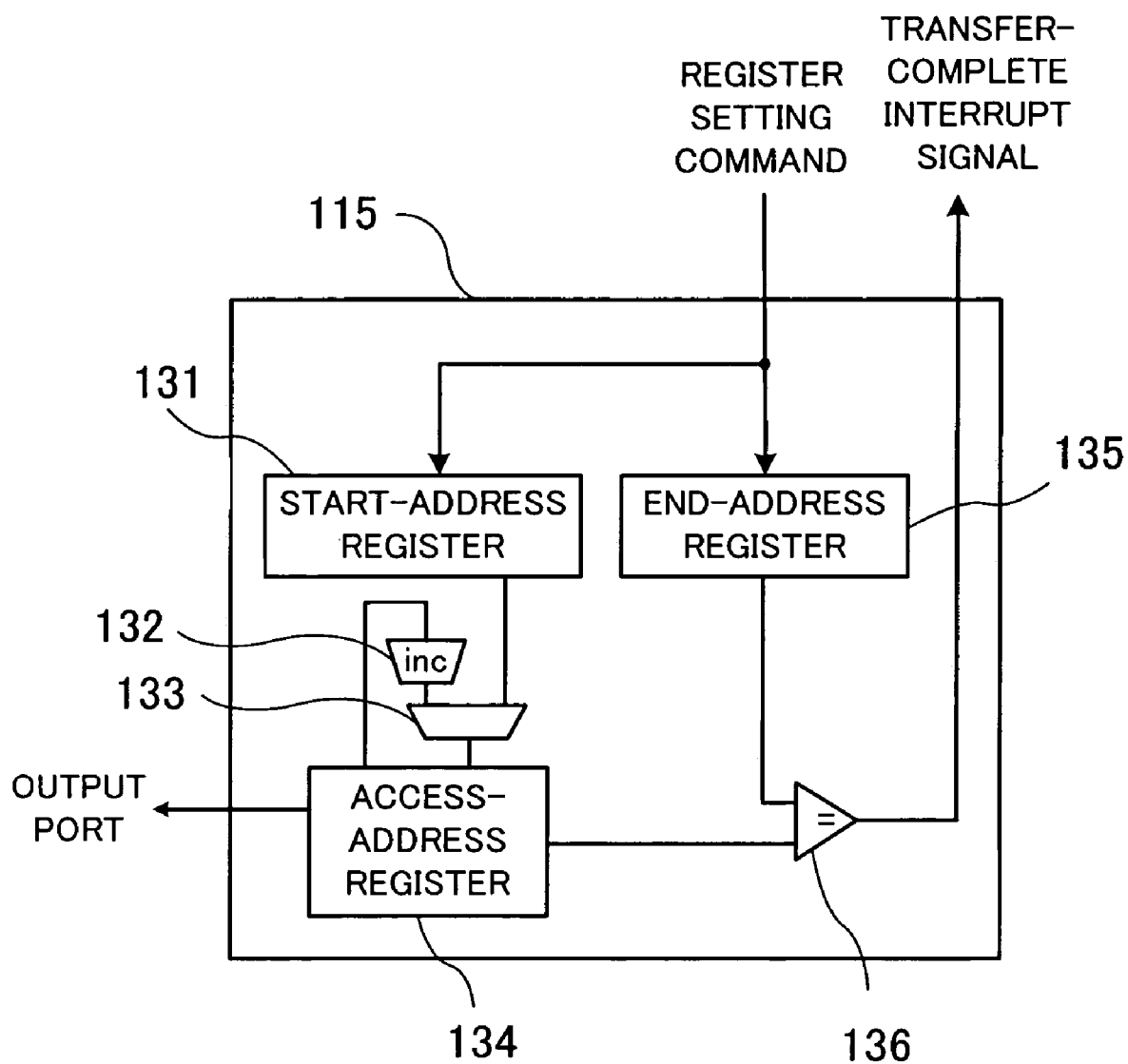
FIG. 4 is a block diagram showing the internal configuration of an output-address converter.

FIG. 4 is a block diagram showing the internal configuration of the output-address converter 115.

The output-address converter 115 includes a start-address register 131, a counter 132, an ALU 133, an access-address register 134, an end-address register 135, and a comparator 136.

The output-address converter 115 begins operating when a register setting command is input.

The start-address register 131 indicates a start address for data transfer to the data-transmission destination (the memory 104 in this embodiment) connected to the output side of the data buffer 112, and when the register setting command is input, it outputs the start address to the ALU 133.

The counter 132 increments a count value for each access to the access-address register 134 and outputs the count value to the ALU 133.

The ALU 133 adds the count value in the counter 132 to the start address output from the start-address register 131 and outputs the result to the access-address register 134.

When there is an output from the ALU 133, the access-address register 134 outputs the value in the access-address register 134 to the output port 114 and outputs the count value to the comparator 136.

The end-address register 135 stores the final address for the data transfer to the memory 104.

The comparator 136 compares the value in the access-address register 134 and the value in the end-address register 135, and when they are the same, it outputs a transfer-complete interrupt signal.

Figure 5:
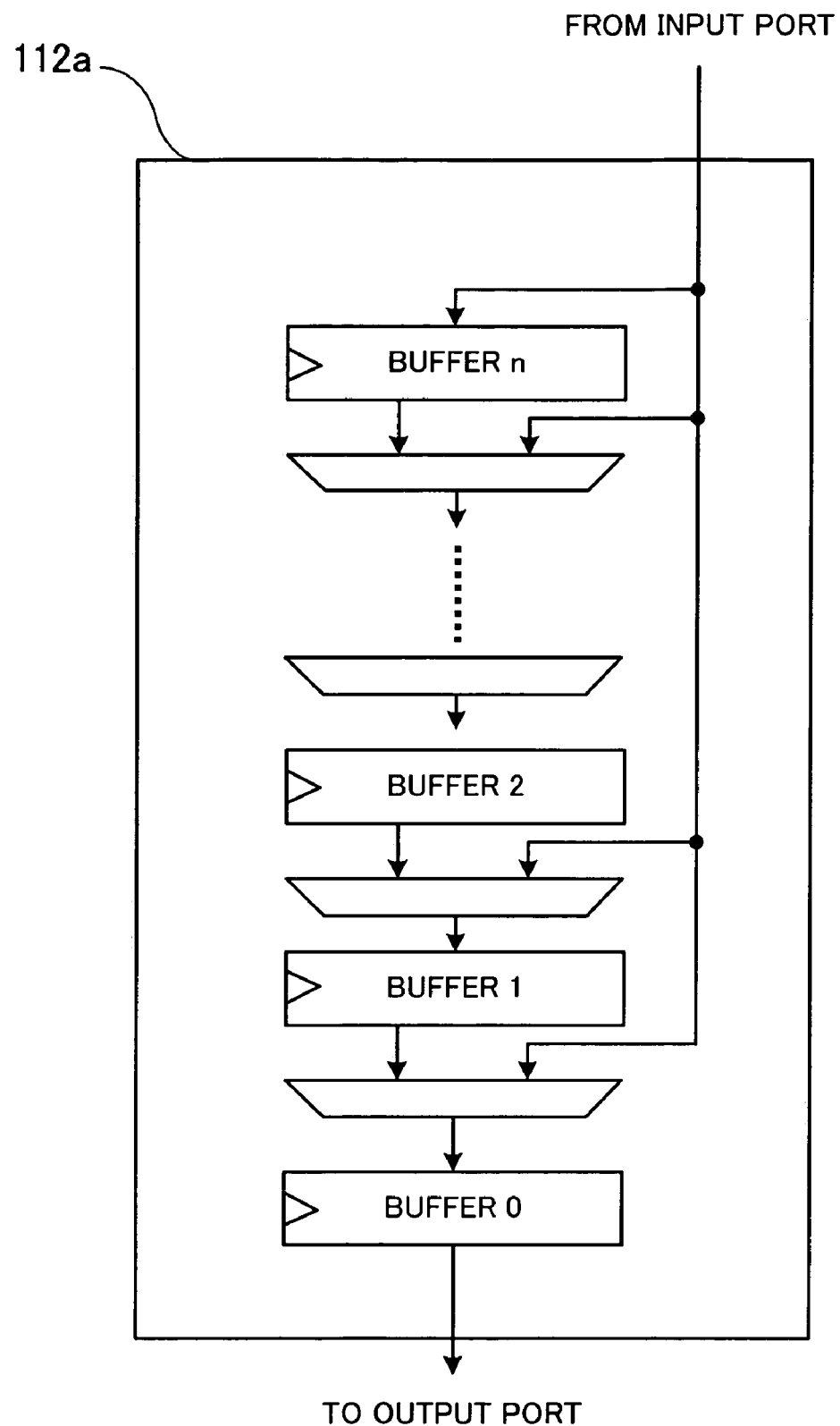
FIG. 5 is a block diagram showing the internal configuration of a shift register.

FIG. 5 is a block diagram showing the internal configuration of the shift register 112a.

The shift register 112a includes n+1 buffers (where n is an integer equal to 1 or more), that is, buffer 0, buffer 1, . . . , buffer n-1, and buffer n.

Write addresses in the shift register 112a start at buffer n and sequentially proceed through buffer n-1, buffer n-2, buffer n-3 . . . . Read addresses start at buffer 0 and sequentially proceed through buffer 1, buffer 2, buffer 3, . . . .

Figure 6:
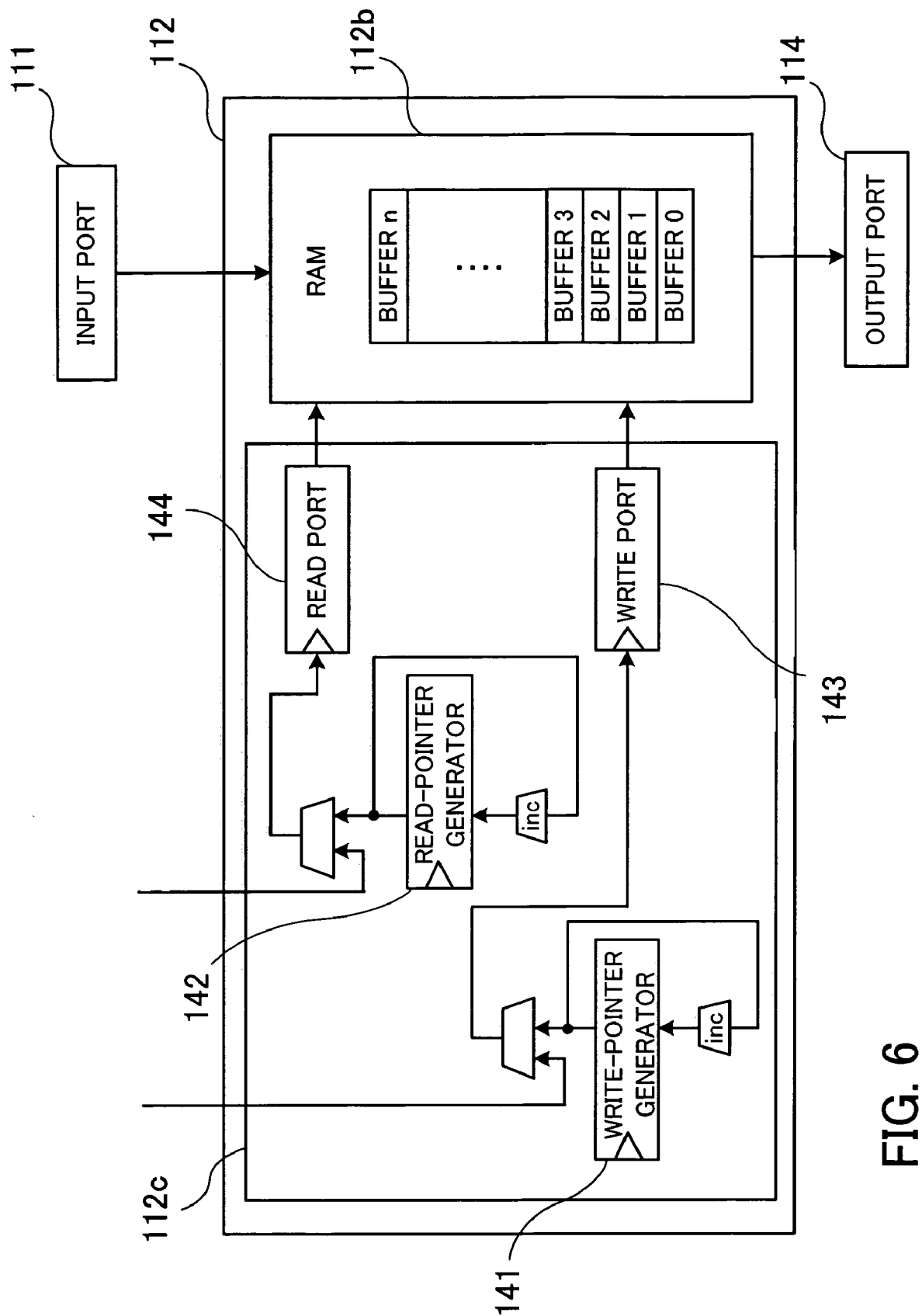
FIG. 6 is a block diagram showing the configuration of a RAM and an address controller.

FIG. 6 is a block diagram showing the configuration of the RAM 112b and the address controller 112c.

The shift register 112a is not shown in FIG. 6.

The RAM 112b is formed of n+1 rows of buffers (where n is an integer equal to 1 or more) provided with a plurality of memory cells, that is, buffer 0, buffer 1, ..., buffer n-1, and buffer n.

The address controller 112c includes a write pointer (hereinafter referred to as "WP") generator 141 for generating a write pointer that indicates the address (for write access) when writing data into the RAM 112b, a read pointer (hereinafter referred to as "RP") generator for generating a read pointer that indicates the address (for read access) when reading data from the RAM 112b, a write port 143, and a read port 144.

The WP generated by the WP generator 141 is output to the RAM 112b via the write port 143. Likewise, the RP generated by the RP generator 142 is output to the RAM 112b via the read port 144.

Next, example configurations of the data transmitting-and-receiving system 100 will be described.

FIG. 7 is a table showing six example configurations of the data transmitting-and-receiving system 100.

In FIG. 7, columns labeled "input side," "output side," "input-address converter," "output-address converter," "transfer mode," and "data-buffer access mode" are arranged horizontally. Data items arranged horizontally are associated with each other and constitute information for each configuration.

The data-transmission source connected to the input side of the stream buffer 110 is shown in the "input side" column. In configurations 1, 3, and 4, the CPU 101 is selected as the data-transmission source, and in configurations 2, 5, and 6, the memory 103 is selected as the data-transmission source.

The data-transmission destination connected to the output side of the stream buffer 110 is shown in the "output side" column. In configurations 1 and 5, the memory 104 is selected as the data-transmission destination, in configurations 2 and 3, the CPU 102 is selected as the data-transmission destination, in configuration 4, the CPU 101 is selected as the data-transmission destination, and in configuration 6, the memory 103 is selected as the data-transmission destination.

In configuration 4, the CPU 101 serves as both the data-transmission source and the data-transmission destination. Similarly, in configuration 6, the memory 103 serves as both the data-transmission source and the data-transmission destination.

In configurations 1 to 6, the selected CPU and memory are used in combination with the stream buffer 110.

The "input-address converter" column shows whether or not it is necessary to use the input-address converter 113. (The circle indicates YES and the cross indicates NO.)

When an active unit that initiates its own data transfer, such as the CPU 101, is connected to the input side of the stream buffer 110, the CPU 101 itself carries out data input to the stream buffer 110. Thus, in configurations 1, 3, and 4, since data transfer can be carried out at a desired timing without using the input-address converter 113, the input-address converter 113 is not necessary.

On the other hand, when a passive unit such as the memory 103 is connected to the input side of the stream buffer 110, in other words, in configurations 2, 5, and 6, the input-address converter 113 must be used for inputting data to the stream buffer 110 at a desired timing.

The "output-address converter" column indicates whether or not the output-address converter 115 needs to be used.

When an active unit that initiates its own data transfer, such as the CPU 102, is connected to the output side of the stream buffer 110, the CPU 102 itself performs data output from the stream buffer 110. Therefore, in configurations 2, 3, and 4, since data transfer can be carried out at a desired timing without using the output-address converter 115, the output address converter 115 is not necessary.

On the other hand, when a passive unit, such as the memory 103 or the memory 104, is connected to the output side of the stream buffer 110, in other words, in configurations 1, 5, and 6, the output-address converter 115 must be used for outputting data from the stream buffer 110 at a desired timing.

The "transfer mode" column indicates whether or not a transfer mode can be used. In configurations where a CPU is not used on at least one of the input side and the output side, the transfer mode indicates that arrangement processing is performed on the data transferred from the data-transmission source to the data buffer 112 or that arrangement processing is performed on the data transferred from the data buffer 112 to the data-transmission destination. In this mode, the data is transferred a desired distance (spacing). The transfer mode can be used in configurations 1, 2, 5, and 6. The transfer mode will be described in detail later.

The "data-buffer access mode" column specifies how the data is written to the data buffer 112 or how the data is read out from the data buffer 112. There are five options, options A to E, for the access mode.

The options A to E will be described next.

Option A

In option A, the shift register 112a is selected as the storage location of the data.

When writing data to the shift register 112a, the data is first written from the input port 111 into buffer n, and sequentially written to buffer n-1, buffer n-2, .... When reading out the data, the data is read-out to the output port 114 beginning with buffer 0, and then sequentially read out from buffer 1, buffer 2, buffer 3, .... In other words, in option A, the shift register 112a (data buffer 112) is used as a first-in first-out (FIFO) buffer.

In option A, using the FIFO configuration allows seamless operation, regardless of the buffer capacity. Also, since it is possible to perform control of the data buffer 112 without using software, the versatility is improved and the load on the CPU, which would normally increase when executing software, is reduced.

In option A, the CPUs 101 and 102 and the memories 103 and 104 connected to the stream buffer 110 can be selected independently. Therefore, option A can be selected in configurations 1 to 6.

Option B

In option B, the RAM 112b is selected as the storage location of the data.

In option B, the RAM 112b is used as a FIFO buffer, like option A. In option B, specifying the WP and RP indicates the write address and the read address in the RAM 112b, respectively. Because it is necessary to specify the WP and RP, at least one of the CPU 101 and the CPU 102 must be connected to the stream buffer 110. Therefore, option B can be selected in configurations 1 to 4.

Next, the data writing and reading operations of the RAM 112b in option B will be described.

Figure 8:
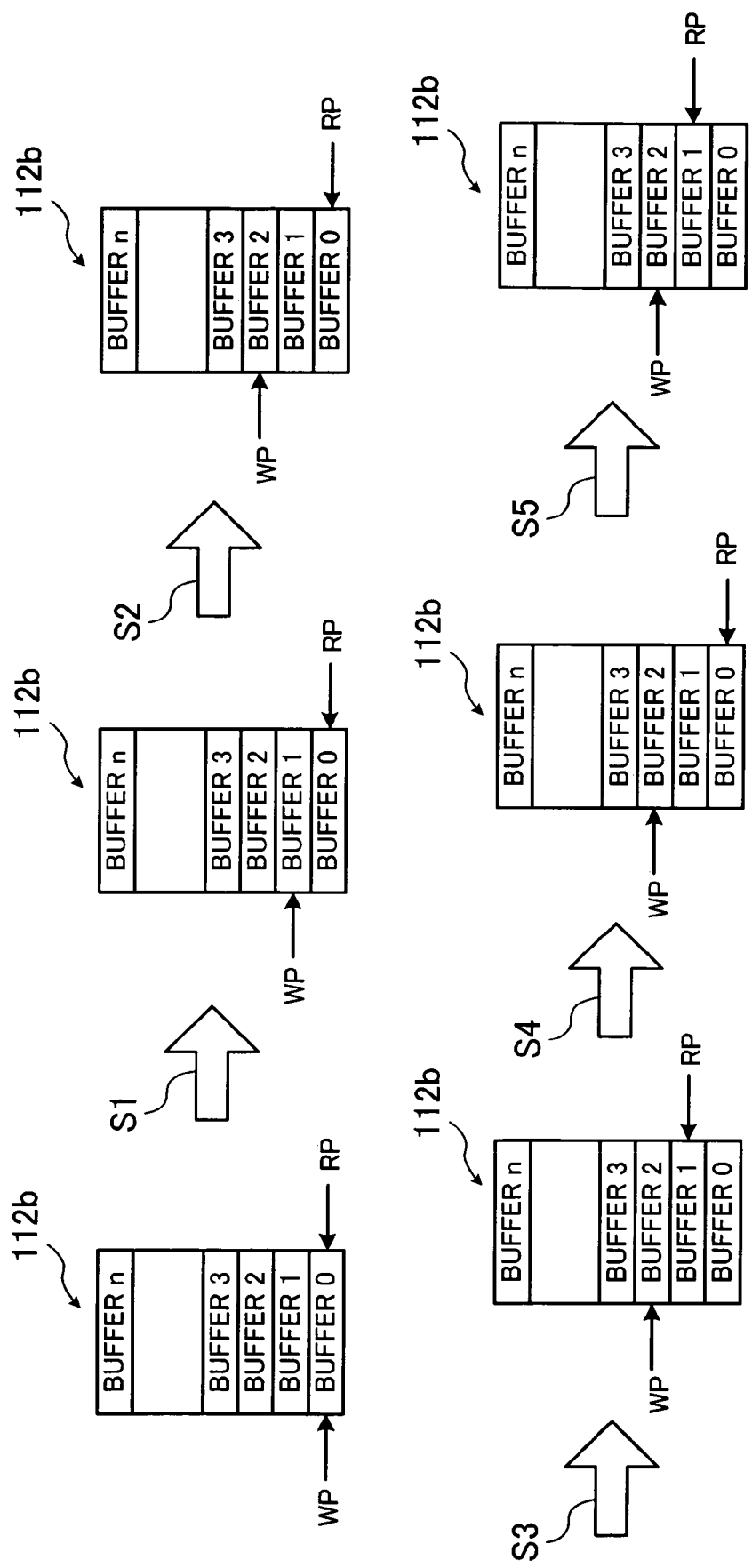
FIG. 8 is an outlined diagram showing an example of the write and read operations of the RAM in option B.

FIG. 8 is an outlined diagram showing an example of the writing and reading operations of the RAM 112b in option B.

In order to make the following description more clear, the address where data is to be written and the address from which data is to be read are shown by arrows.

First, the WP and RP both point to buffer 0. This is the initial state.

Next, the WP points to buffer 1 (step S1). Thus, data is written into buffer 1. At this time, since the RP points to buffer 0, data in buffer 0 is read out. Next, the WP points to buffer 2 (step S2). Thus data is written into buffer 2. Next, the RP points to buffer 1 (step S3). Thus, data in buffer 1 is read out. Next, the RP points to buffer 0 (step S4). Thus, the data in buffer 0 is read out again. Next, the RP points to buffer 1 (step S5). Thus, the data in buffer 1 is read out again.

In option B, the RAM 112b is used as a FIFO buffer, similarly to option A. Also, by "rewinding" the RP (the operations in steps S3 and S4), the same data can be repeatedly extracted.

Option C

In option C, the RAM 112b is selected as the storage location of the data.

In option C, the data-transmission source connected to the input port 111 directly specifies an address in the RAM 112b. The readout of data is performed by specifying the RP. Because the address in the RAM 112b must be directly specified when writing, the CPU 101 must be connected to the input port 111. Therefore, option B can be selected in configurations 1, 3, and 4.

In option C, data can be re-used and so the stream buffer 110 can be used like a memory.

Option D

In option D, the RAM 112b is selected as the storage location of the data.

In option D, the data-transmission destination connected to the output port 114 directly specifies an address in the RAM 112b. Data writing is performed by specifying the WP. Because the address in the RAM 112b must be directly specified when reading, the CPU 101 or the CPU 102 must be connected to the output port 114. Therefore, option D can be selected in configurations 2, 3, and 4.

In option D, data can be re-used and so the stream buffer 110 can be used like a memory.

Option E

In option E, the RAM 112b is selected as the storage location of the data.

In option E, the RAM 112b is used as a first-in last-out (FILO) buffer. In option E, the RP indicates the address written to by using the WP immediately before. Because the WP and RP must be specified, at least one of the CPU 101 and the CPU 102 must be connected to the stream buffer 110. Therefore, option E can be selected in configurations 1 to 4.

Next, the writing and reading operations of the RAM 112b in option E will be described.

Figure 9:
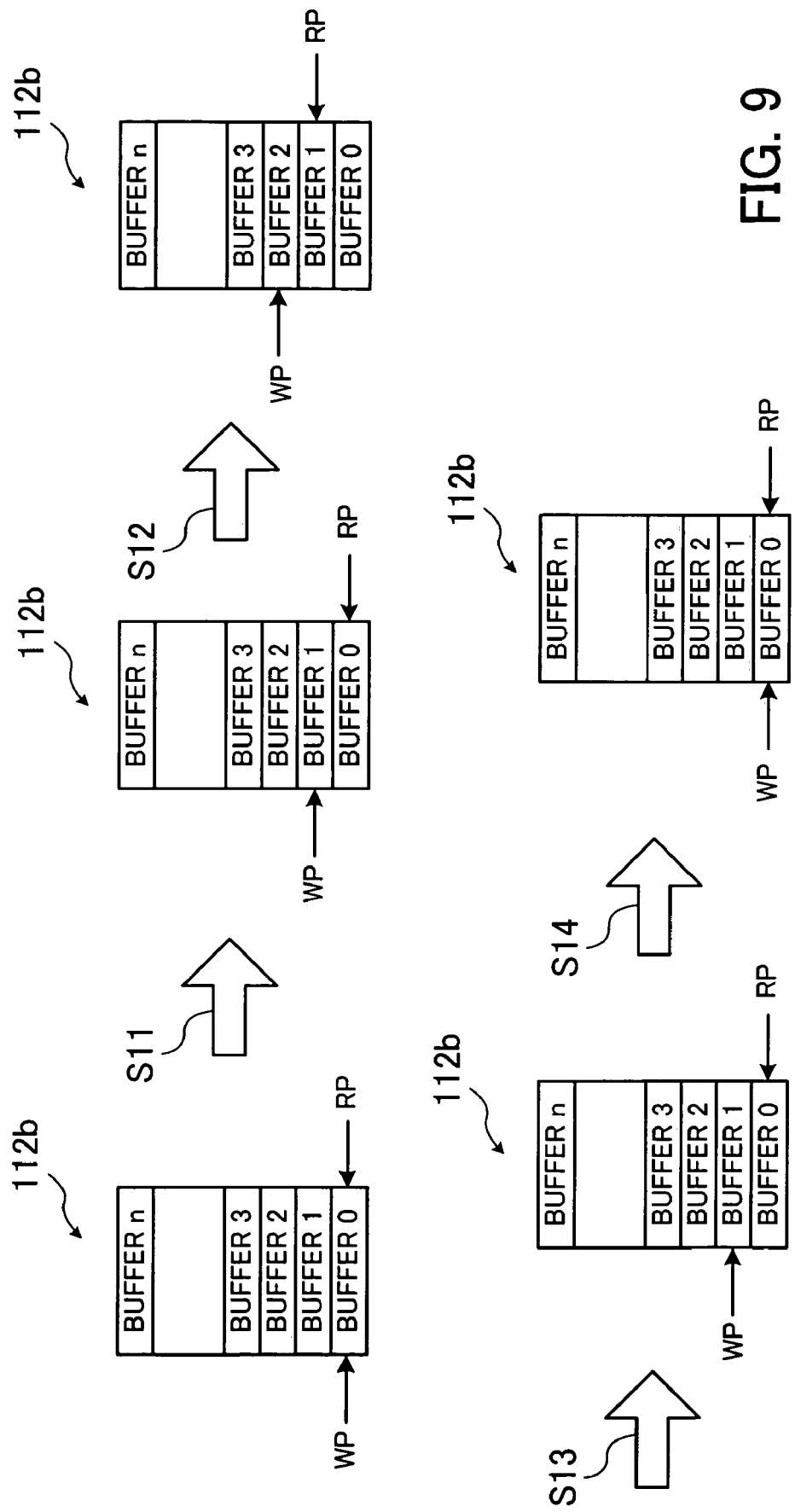
FIG. 9 is an outlined diagram showing an example of the write and read operations of the RAM in option E.

FIG. 9 is an outlined diagram showing an example of the writing and reading operations of the RAM 112b in option E.

First, the WP and RP point to buffer 0. This is the initial state. Next, the WP points to buffer 1 (step S11). Thus, data is written into buffer 1. At this time, because the RP points to buffer 0, the data in buffer 0 is read out. Next, the WP points to buffer 2 and the RP points to buffer 1 (step S12). Thus, data is written into buffer 2 and the data in buffer 1 is read out. Next, the WP points to buffer 1 and the RP points to buffer 0 (step S13). Thus, data is written into buffer 1 and the data in buffer 0 is read out. Next, the WP points to buffer 0 (step S13). Thus, data is written into buffer 0.

In option E, since the RAM 112b is used as a FILO buffer, it can be used as a stack memory, within the capacity of the RAM 112b.

Next, Configurations 1 to 6 will be described in detail.

Configuration 1

Figure 10:
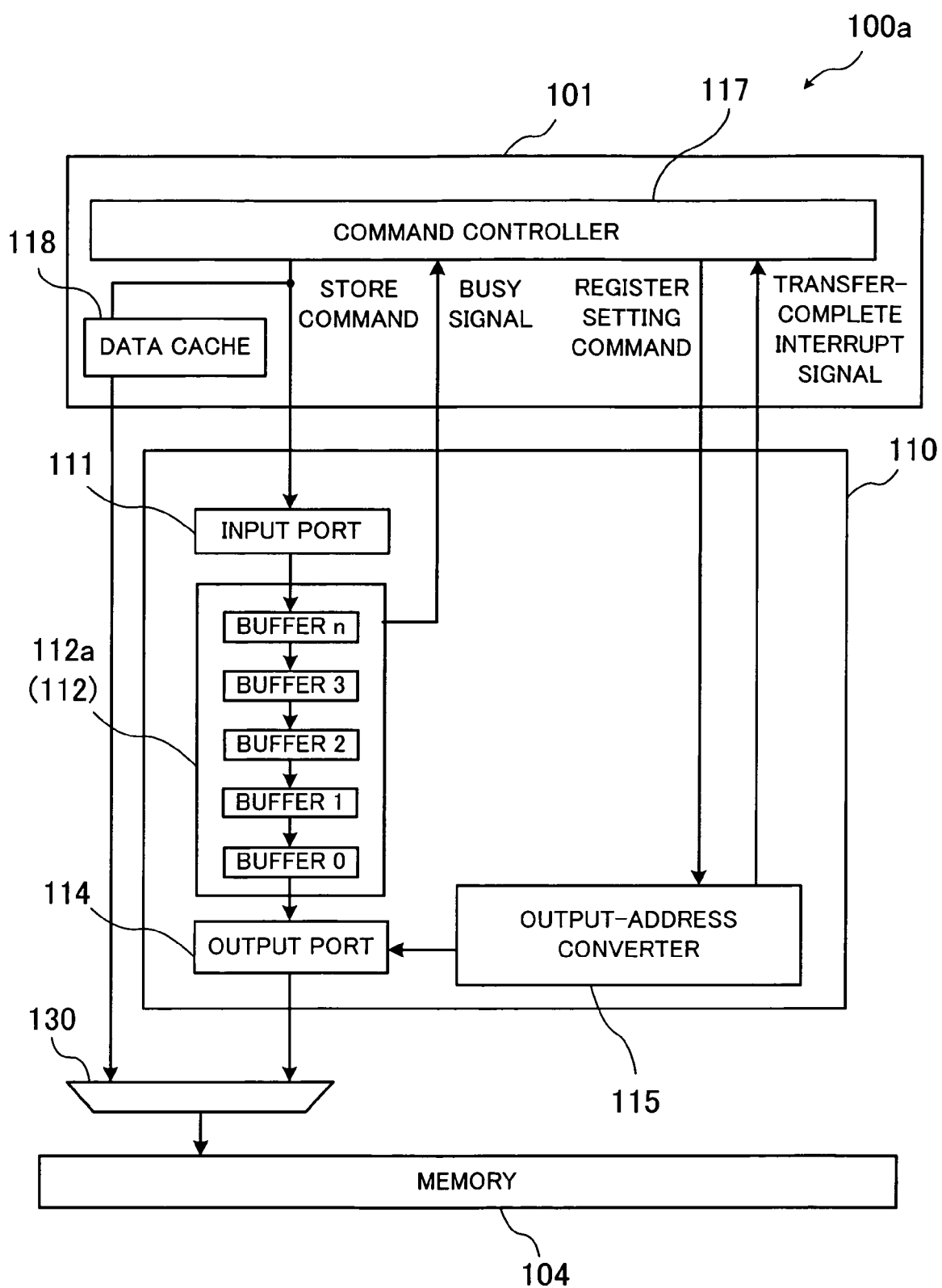
FIG. 10 is a block diagram showing a data transmitting-and-receiving system of configuration 1.

FIG. 10 is a block diagram showing a data transmitting-and-receiving system of Configuration 1.

As shown in FIG. 10, a data transmitting-and-receiving system 100a includes the stream buffer 110, the CPU 101 provided at the input side of the stream buffer 110, and the memory 104 provided at the output side of the stream buffer 110. An ALU 130 is provided between the output port 114 and the memory 104.

In this configuration, a case where option A is selected for the data buffer 112 will be described as a representative example.

For the sake of ease of comprehension of each figure from FIG. 10 onwards, the components in the stream buffer 110 which are not selected according to the options described above (in Configuration 1, the input-address converter 113, the RAM 112b, and the address controller 112c) will be omitted.

The CPU 101 outputs store commands, register setting commands, and so on and includes a command controller 117 to which various signals are input, such as a busy signal and a transfer-complete interrupt signal, and a data cache 118 for caching data having a high level of reusability.

The CPU 101 caches data having a high level of reusability in the data cache 118 and stores it in the memory 104 via the ALU 130. Also, the CPU 101 outputs data having a low level of reusability to the shift register 112a via the input port 111 based on a store command and others.

The data buffered in the shift register 112a is sequentially output to the output port 114. When data read-out from the shift register 112a does not keep up with the data input based on the store command and all buffers in the shift register 112a become filled up with data, the shift register 112a outputs a busy signal to the command controller 117 in the CPU 101.

The output port 114 receives from the output-address converter 115 an address to be accessed in the memory 104 for transferring the data.

Here, the output-address converter 115 has three transfer modes, which are described below, when transferring data to the memory 104.

First Transfer Mode

Figure 11:
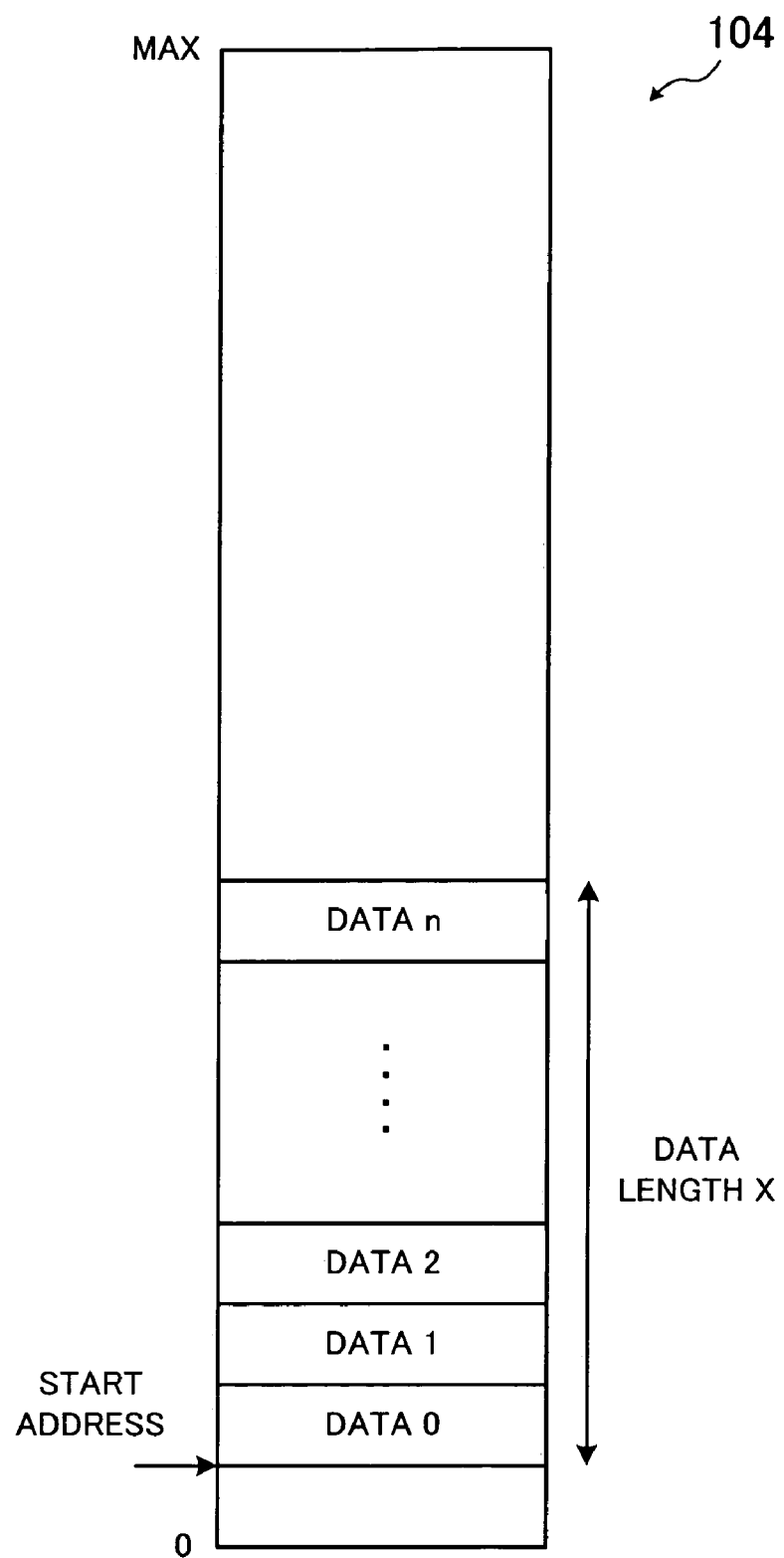
FIG. 11 is an outlined diagram of a first transfer mode.

FIG. 11 is an outlined diagram showing a first transfer mode.

In the first transfer mode, m (where $1 \leq m \leq n+1$) data items are consecutively transferred from a desired buffer in the shift register 112a (a desired start address in the RAM 112b) to the memory 104. FIG. 11 shows the memory 104 to which n+1 data items of data length X are transferred according to the first transfer mode. Hereinafter, the first transfer mode is called a "consecutive access mode."

The consecutive access mode is used in standard array access, for example, when carrying out image processing in the horizontal direction in a two-dimensional arrangement of image data.

Figure 12:
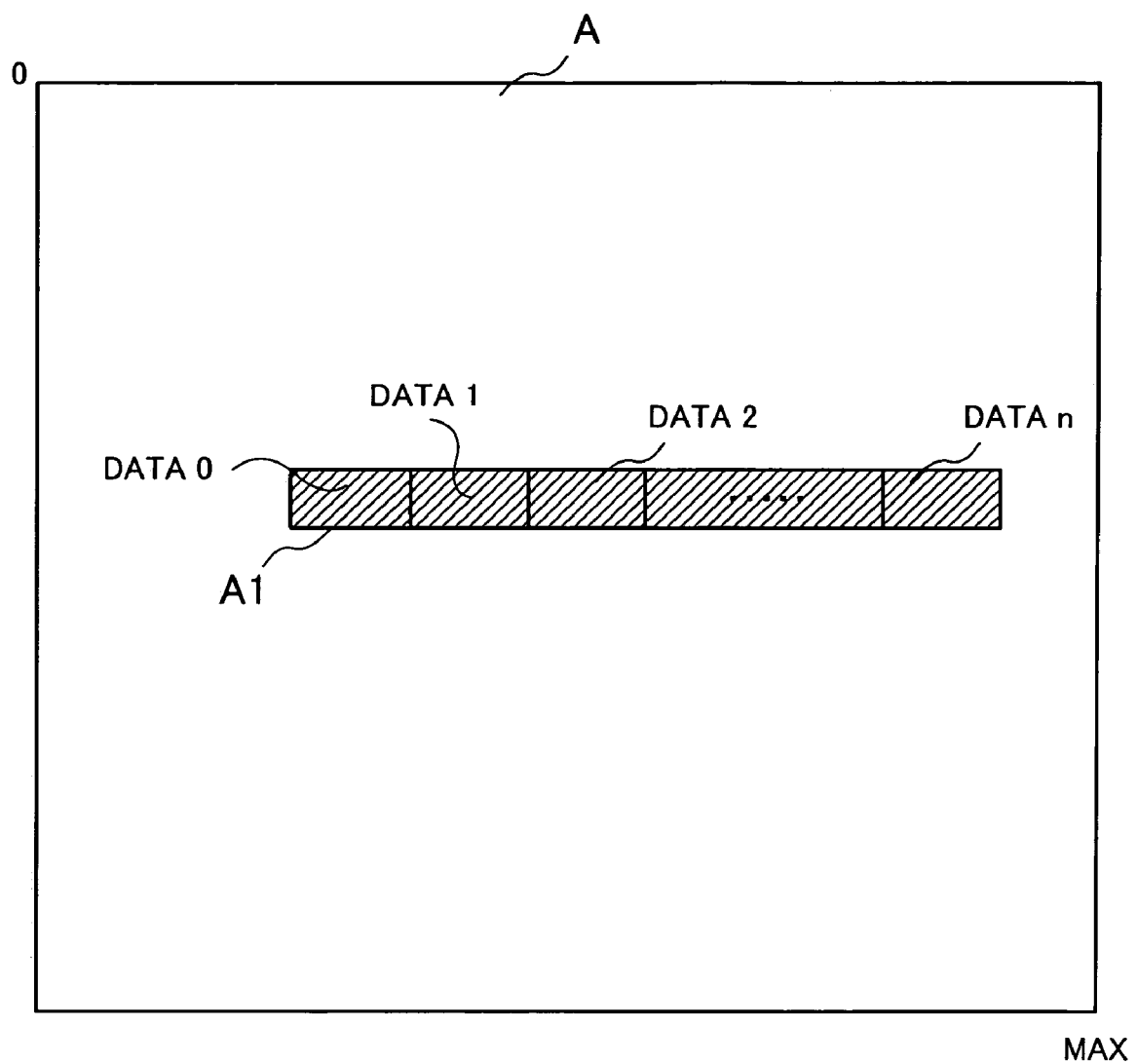
FIG. 12 is an outlined diagram of an example using a consecutive access mode.

FIG. 12 is an outlined diagram showing an example in which the consecutive access mode is used.

For example, when the address length (address 0 to address MAX) in the memory 104 and the address length of a full image that can be displayed in an image display region A of an image display device are set to be the same, if predetermined data is to be displayed in region A1 (a shaded region in FIG. 12) inside the image display region A, the output-address converter 115 consecutively outputs data 0, data 1, data 2, ..., and data n from the output port 114 so that data 0, data 1, data 2, ..., and data n are stored at addresses in the memory 104 corresponding to the region A1. By doing so, the data transferred from the memory 104 to the image display device (not shown) is consecutively displayed in the horizontal direction, as shown in FIG. 12.

Second Transfer Mode

Figure 13:
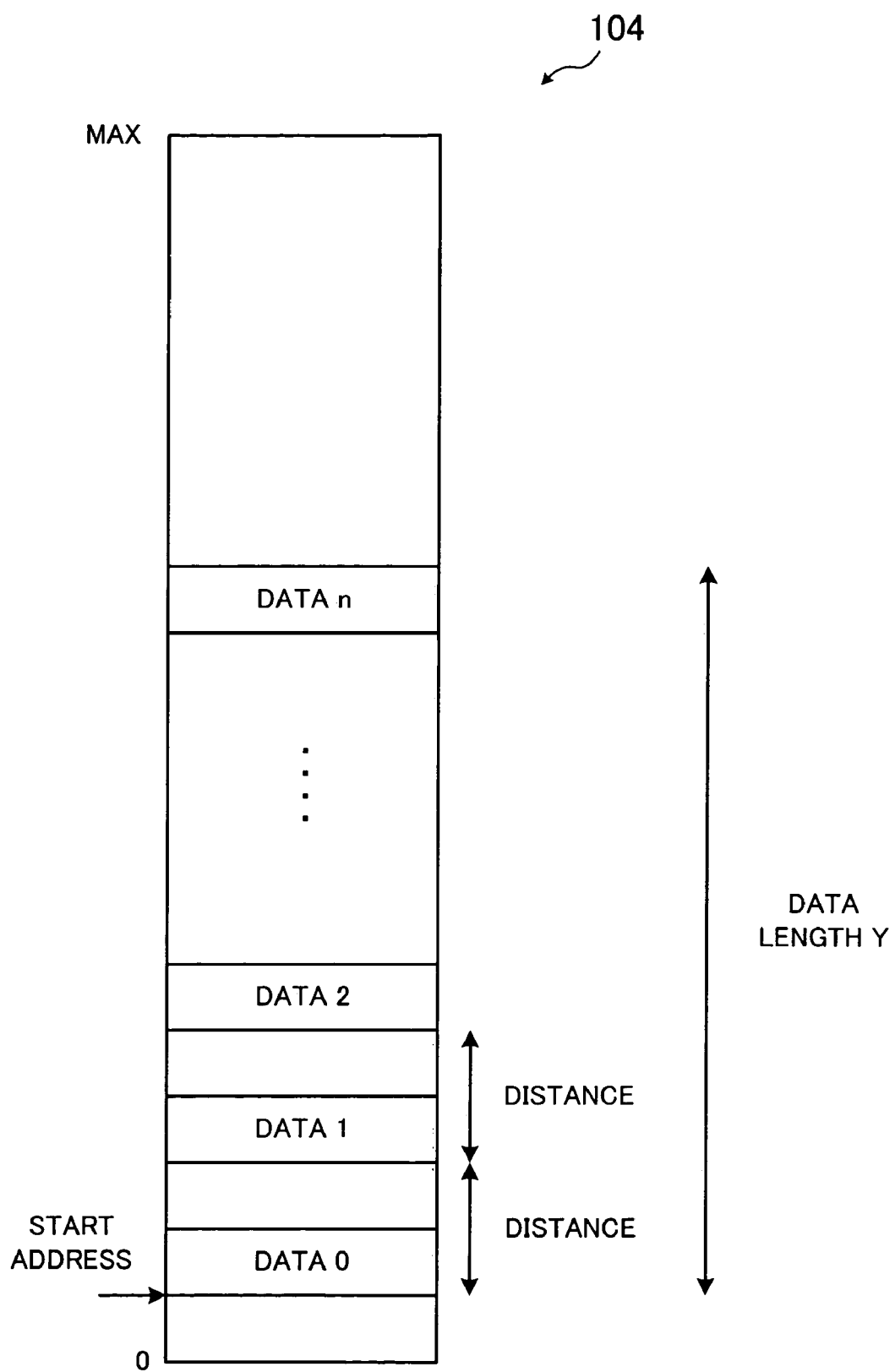
FIG. 13 is an outlined diagram of a second transfer mode.

FIG. 13 is an outlined diagram showing a second transfer mode.

In the second transfer mode, when transferring m data items to the memory 104, the computational function of the ALU 133 in the output-address converter 115 is modified to adjust the timing at which values are output from the access-address register 134, so that, from a desired start address in the memory 104, a fixed distance from data item to data item is maintained. FIG. 13 shows the memory 104 into which n+1 data items of data length Y are to be transferred according to the second transfer mode. Hereinafter, the second transfer mode is referred to as the "distance access mode." The distance access mode is used when, for example, two dimensional image data is consecutively displayed in the vertical direction on an image display device.

Figure 14:
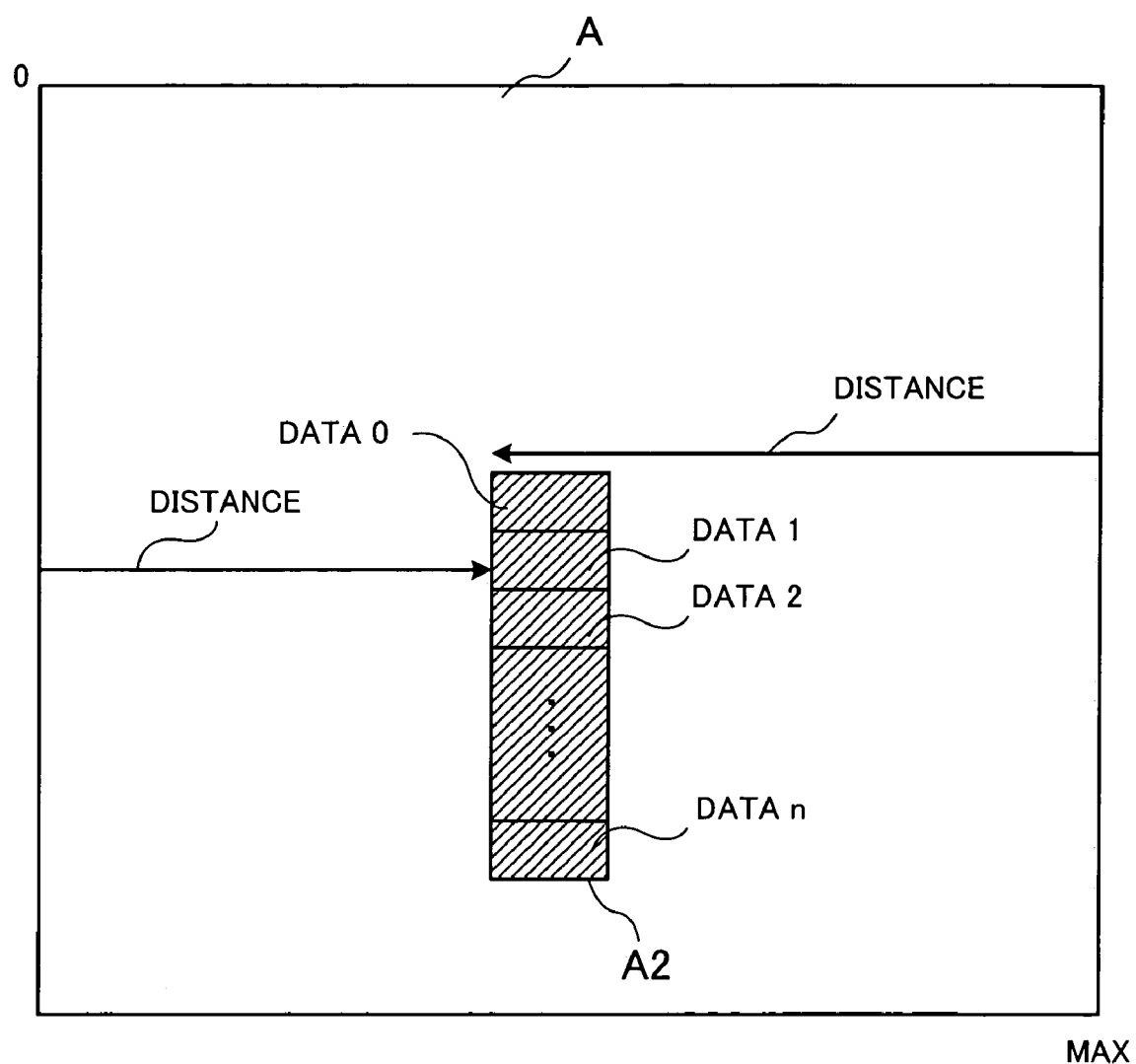
FIG. 14 is an outlined diagram showing an example using a distance access mode.

FIG. 14 is an outlined diagram showing an example in which the distance access mode is used.

When the address length of the memory 104 (address 0 to address MAX) and the address length of the largest image data displayed in an image display region A on the image display device are set to be the same, if predetermined data is to be displayed in a region A2 (a shaded region in FIG. 14) in the image display region A, the output-address converter 115 outputs data 0, data 1, data 2, ..., and data n from the output port 114 so that the data is stored in the memory 104 in such a manner that the region between data 0 and data 1 in the region A2 corresponds to the distance shown in FIG. 13. By doing so, the data transferred from the memory 104 to the image display device (not shown) is displayed so as to be separated by a predetermined distance, and as a result, the data is consecutively displayed in the vertical direction.

Third Transfer Mode

Figure 15:
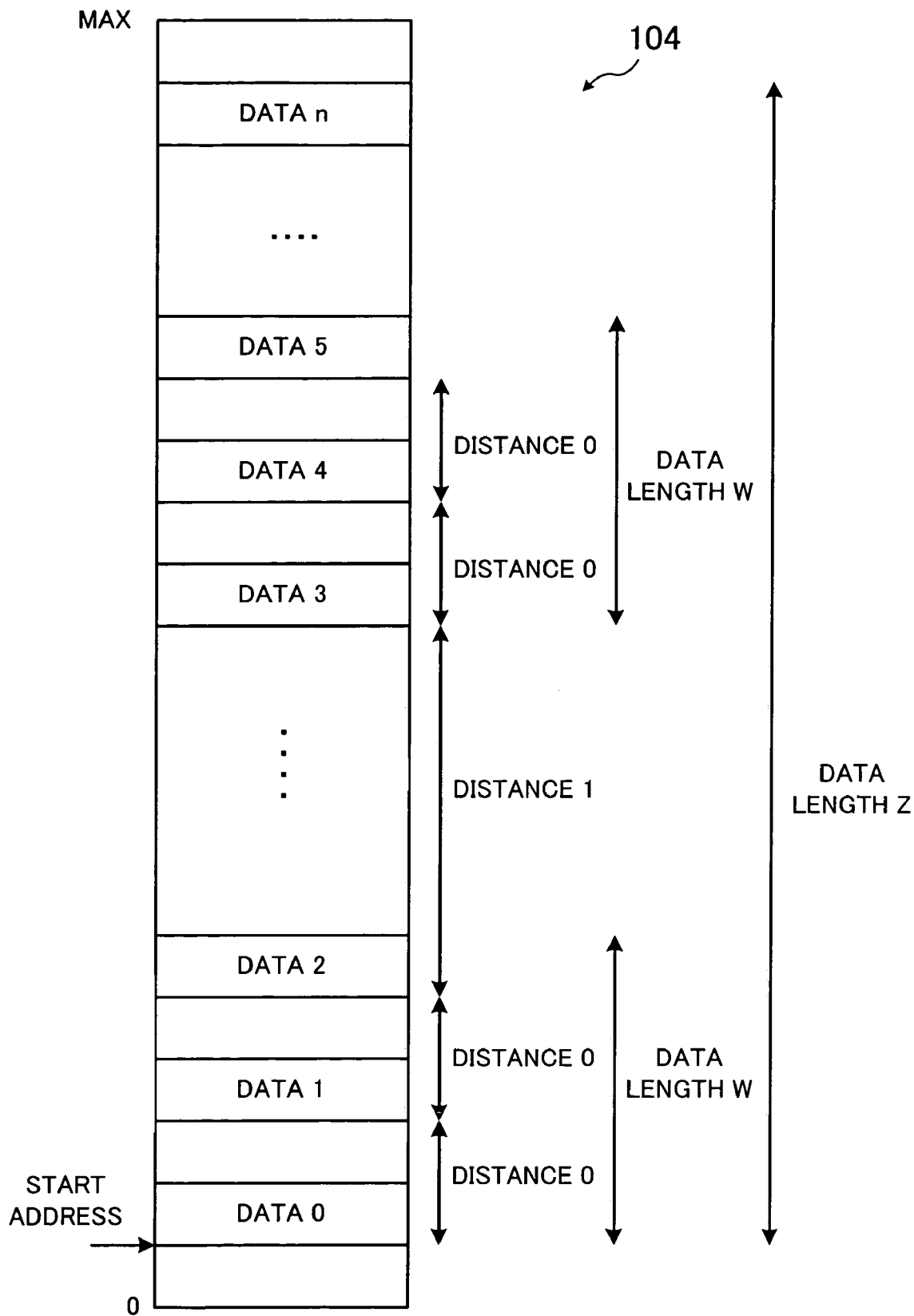
FIG. 15 is an outlined diagram of a third transfer mode.

FIG. 15 is an outlined diagram showing a third transfer mode.

In the third transfer mode, when n+1 data items are transferred to the memory 104, the calculation function of the ALU 133 in the output address converter 115 is modified to adjust the timing at which values are output from the access address register 134 so that, from a desired start address in the memory, a plurality of blocks formed of m (where m is an integer less than or equal to n+1) data items of data length W, each maintaining a fixed distance (distance 0) from data item to data item, maintain a fixed distance (distance 1) from block to block. FIG. 15 shows the memory 104 into which n++1 data items of data length Z are transferred according to the third transfer mode. Hereinafter, the third transfer mode is referred to as a "multi-distance access mode." The multi-distance access mode is used when, for example, two-dimensional image data is to be displayed in a predetermined rectangular region on an image display device.

Figure 16:
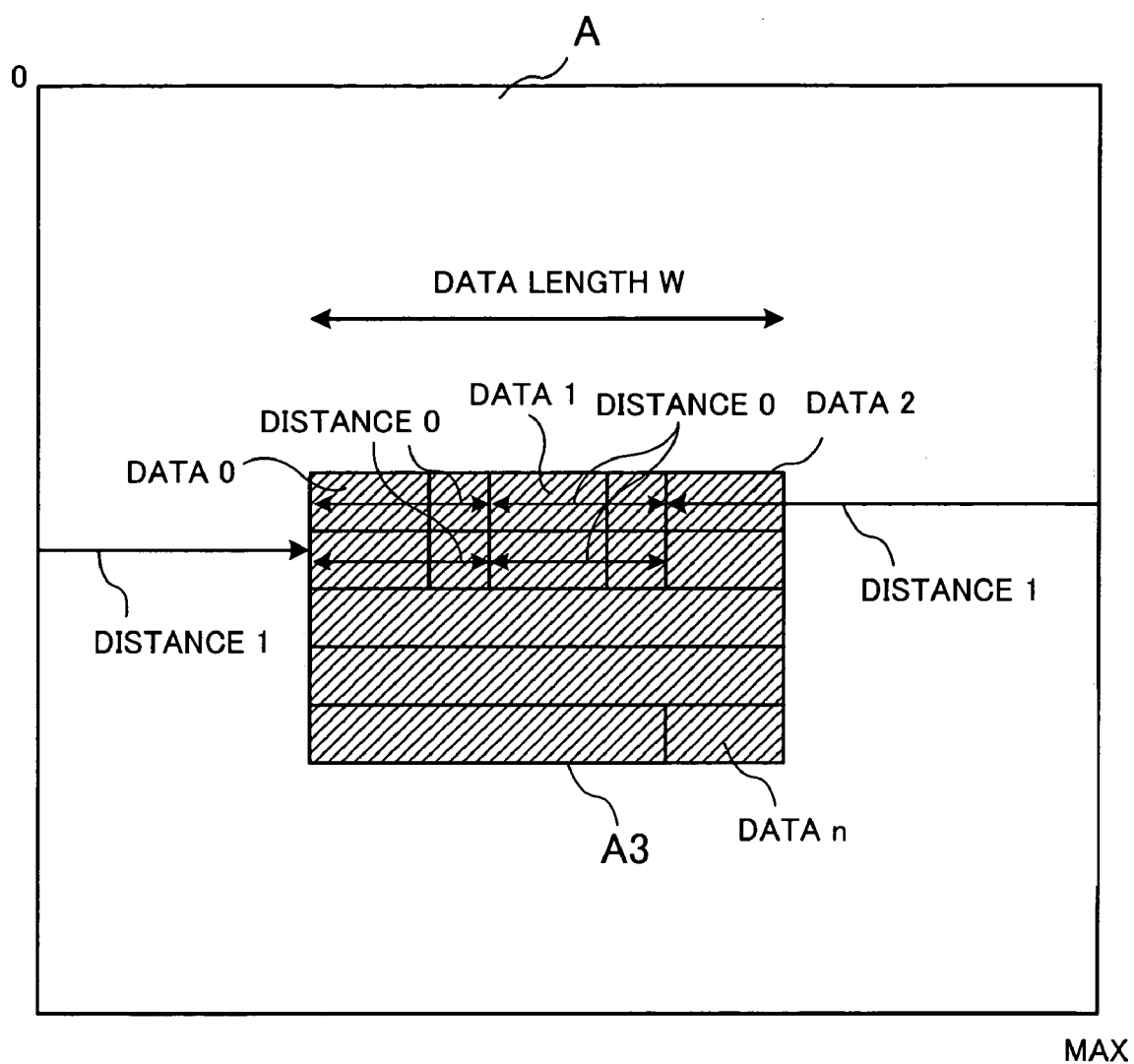
FIG. 16 is an outlined diagram showing an example using a multi-distance access mode.

FIG. 16 is an outlined diagram showing an example in which the multi-distance access mode is used.

For example, when the address length (address 0 to address MAX) in the memory 104 and the address length of the largest image data displayed in an image display region A on an image display device are set to be equal, if predetermined data is to be displayed in region A3 (a shaded region in FIG. 16) in the image display region A, the output-address converter 115 outputs data 0, data 1, data 2, ..., and data n from the output port 114 so that the data is stored in the memory 104 in such a manner that the distance between data 0 and data 1 in region A3 corresponds to distance 0 shown in FIG. 15, and the distance between the end of each row in region A3 and the beginning of the next row corresponds to distance 1. By doing so, the data transferred from the memory 104 to the image display device (not shown) is displayed so as to be separated by a predetermined distance, and as a result, the data is consecutively displayed in the vertical direction.

By suitably applying these three transfer modes depending on the situation, it is possible to store data at desired addresses in the memory 104.

Next, the operation of the data transmitting-and-receiving system 100a will be described.

First, before executing software for using the stream buffer 110, the stream buffer 110 is initialized. More concretely, the start-address register 131 and the end-address register 135 in the output-address converter 115 are configured based on a register setting command from the CPU 101 (which may be a dedicated command, or it may be implemented as a special address store command).

Next, the software for actually using the stream buffer 110 is started. The software outputs generated data from the CPU 101 as store data. (This embodiment shows an example which is implemented by store commands having a fixed address indicating the stream buffer, without using a special command in a store operation in the stream buffer.)

The store command input to the stream buffer 110 is stored as required in the data buffer 112 via the input port 111.

Next, the output-address converter 115 copies the contents of the start-address register 131, for outputting the initial data, to the access-address register 134 via the ALU 133. Then, the access-address register 134 outputs the value in the access-address register 134 to the output port 114 and increments the value in the counter 132.

The output port 114 accesses the memory 104 when the access-address register 134 outputs the value (that is, at the timing of the output value from the access address register 134).

With this data transmitting-and-receiving system 100a of Configuration 1, it is possible to transfer data having a low level of reusability to the memory 104 without going via the data cache 118.

Configuration 2

Next a data transmitting-and-receiving system of Configuration 2 will be described.

Figure 17:
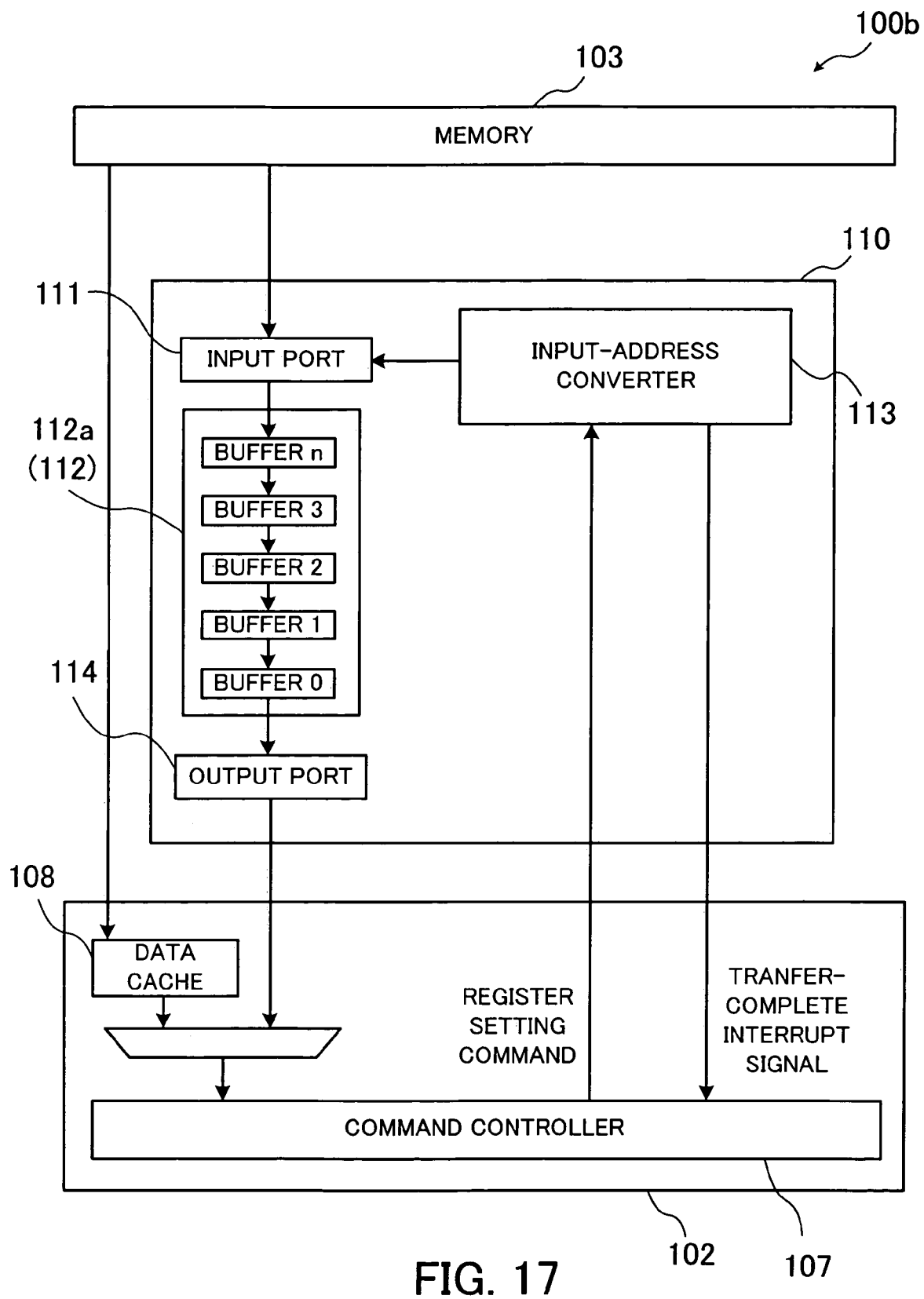
FIG. 17 is a block diagram showing a data transmitting-and-receiving system of configuration 2.

FIG. 17 is a block diagram showing the transmitting-and-receiving system in Configuration 2.

In the following, a data transmitting-and-receiving system 100b of Configuration 2 will be described by focusing on the differences from the data transmitting-and-receiving system 100a described above, and a description of similarities will be omitted.

The data transmitting-and-receiving system 100b of Configuration 2 includes the stream buffer 110, the memory 103 provided at the input side of the stream buffer 110, and the CPU 102 provided at the output side of the stream buffer 110.

The stream buffer 110 in Configuration 2 reads out data from the memory 103 asynchronously with respect to the CPU 102 via the input port 111, and the CPU 102 extracts data from the stream buffer 110 based on a load command (or an operation corresponding thereto).

The input-address converter 113 determines whether or not the data buffer 112 is full and controls the issuing of requests to the memory.

Therefore, the parts of the stream buffer 110 used in Configuration 2 are the input port 111, the data buffer 112, the input-address converter 113, and the output port 114.

The transfer modes are used in Configuration 2 when data is transferred from the memory 103 to the data buffer 112.

The transfer modes used in Configuration 2 are described below, but the description focuses on the differences from the transfer mode used in Configuration 1 described above, and a description of any similarities is omitted.

Consecutive Access Mode

In the consecutive access mode in Configuration 2, m data items are consecutively transferred to the shift register 112a starting at a predetermined start address in the memory 103.

Distance Access Mode

In the distance access mode in Configuration 2, when m data items are transferred to the shift register 112a, the computational function of the ALU 123 in the input-address converter 113 is modified to adjust the timing at which values are output from the access-address register 124, so that a fixed distance is maintained from data item to data item from a desired buffer in the shift register 112a.

Multi-distance Access Mode

In the multi-distance access mode in Configuration 2, when n+1 data items are transferred to the shift register 112a, the computational function of the ALU 123 in the input-address converter 113 is modified to regulate the timing at which values are output from the access-address register 124 so that, from a predetermined start address in the memory 104, a plurality of blocks formed of m data items (where m is an integer less than or equal to n+1), each maintaining a fixed distance (distance 0) from data item to data item, maintain a fixed distance (data length 0) from block to block.

Next, the operation of the data transmitting-and-receiving system 100b of Configuration 2 will be described.

First, prior to executing software for actually using the stream buffer 110, the stream buffer 110 is initialized. Concretely, the start-address register 121 and the end-address register 125 in the input-address converter 113 are configured based on register setting commands from the CPU 102 (these may be dedicated commands or they may be implemented as special address store commands).

Next, activation of data transfer with the stream buffer 110 is instructed. More concretely, an activation instruction is sent to the access-address register 124 based on a register setting command from the command controller 107.

When the access-address register 124 receives the instruction to start data transfer, the contents of the start-address register 121 are first copied to the access-address register 124 for the initial data input in the input-address converter 113. Next, the access-address register 124 outputs the value in the access address register 124 to the input port 111.

The input port 111 accesses the shift register 112a when the value is output from the access-address register 124 (that is, at the timing of the output value from the access-address register 124).

The access address register 124 increments the value in the access address register 124 every time when each data item is output to the input port 111.

The comparator 126 compares the value in the end-address register 125 and the value in the access-address register 124, and when these values are equal, it outputs a transfer-complete interrupt signal to the command controller 107.

After issuing the data transfer instruction, the CPU 102 executes the software for actually using the stream buffer 110 at a desired timing. The software reads out data from the stream buffer 110 as required. This embodiment shows an example implemented by a load command having a fixed address indicating the stream buffer 110, without using a special command in the load operation from the stream buffer 110. In this embodiment, it is assumed that, when there is not yet any data when reading from the stream buffer 110 (that is, when the data buffer is empty), the stream buffer 110 does not return any data and causes the CPU 102 to wait.

In the data transmitting-and-receiving system 100b of Configuration 2, the same advantages as those of the data transmitting-and-receiving system 100a described above can be obtained. In other words, data having a low level of reusability, which is used by the CPU, can be read out from the memory without passing through a cache memory.

Configuration 3

Next, a data transmitting-and-receiving system of Configuration 3 will be described.

Figure 18:
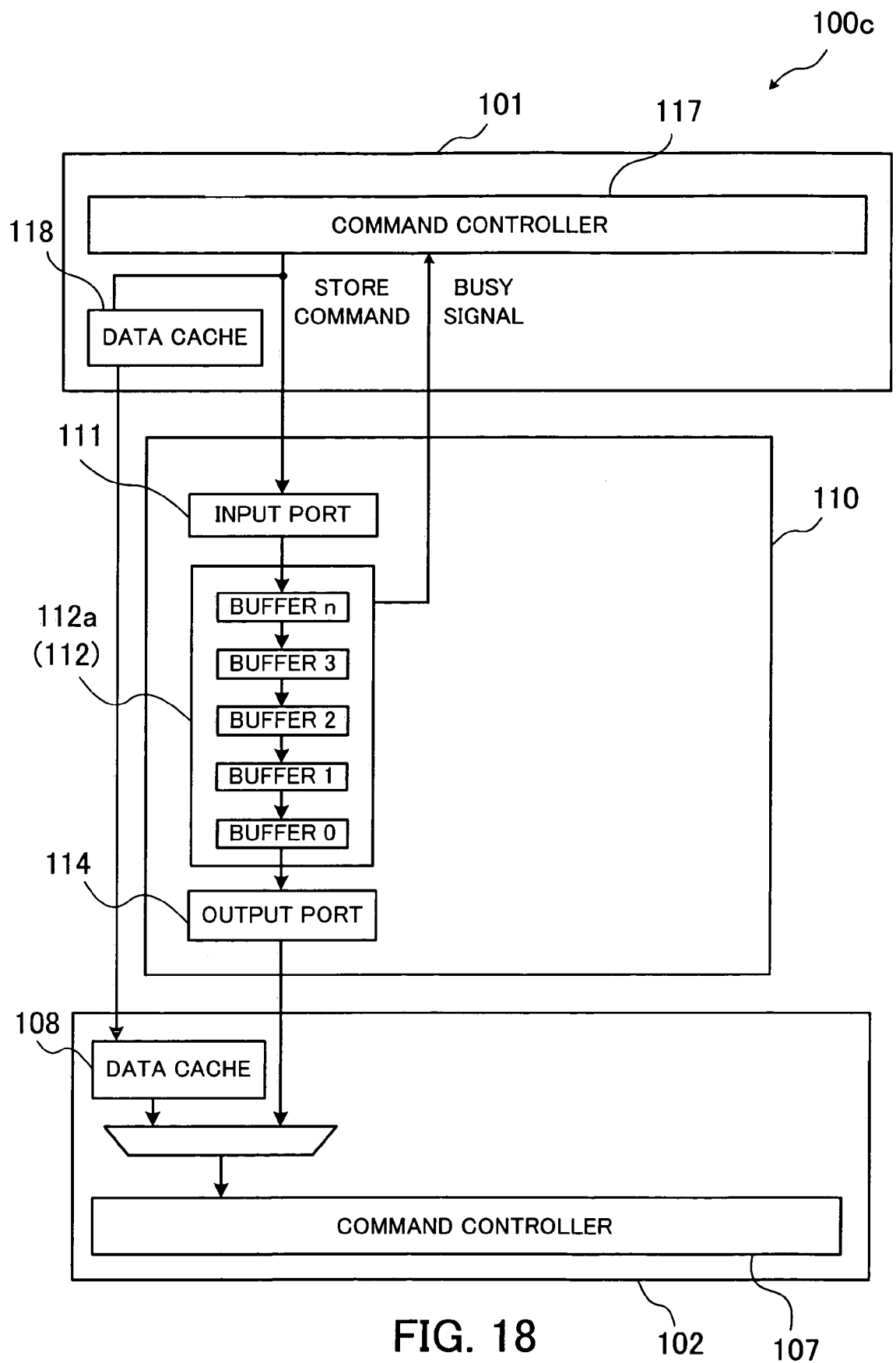
FIG. 18 is a block diagram showing a data transmitting-and-receiving system of configuration 3.

FIG. 18 is a block diagram showing the transmitting-and-receiving system of Configuration 3.

In the following, a data transmitting-and-receiving system 100c of Configuration 3 will be described by focusing on the differences from the data transmitting- and receiving systems 100a and 100b described above, and a description of similarities will be omitted.

The data transmitting-and-receiving system 100c of Configuration 3, which functions as a communication buffer between two different CPUs, includes the stream buffer 110, the CPU 101 provided at the input side of the stream buffer 110, and the CPU 102 provided at the output side of the stream buffer 110.

When the CPUs 101 and 102 are connected to the input and output sides of the stream buffer 110, respectively, data inputting to the stream buffer 110 is carried out by the CPU 101 itself, and data outputting from the stream buffer 110 is carried out by the CPU 102 itself. Therefore, in Configuration 3, neither the input-address converter 113 nor output-address converter 115 is used. As a result, the components constituting the stream buffer 110 used in Configuration 3 are the input port 111, the output port 114, and the data buffer 112.

In Configuration 3, because a desired address and data to be stored at the address can be set in the CPU 101 and the CPU 102, it is not necessary to change the transfer mode when transmitting data. Therefore, a transfer mode option does not need to be set in Configuration 3.

The data transmitting-and-receiving system 100c in Configuration 3 can achieve the same advantages as the data transmitting-and-receiving systems 100a and 100b described above.

Configuration 4

Next, a data transmitting-and-receiving system of Configuration 4 will be described.

Figure 19:
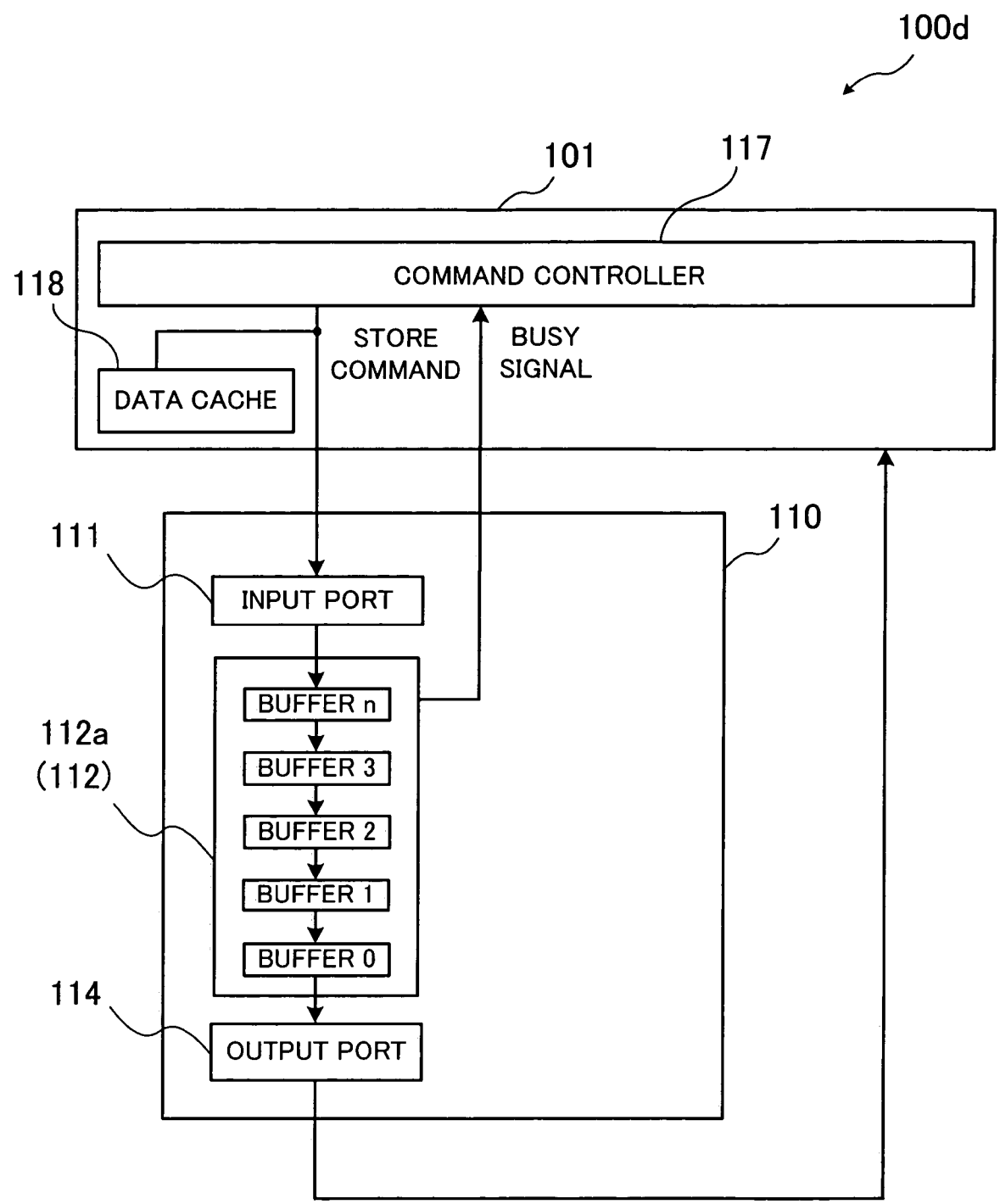
FIG. 19 is a block diagram showing a data transmitting-and-receiving system of configuration 4.

FIG. 19 is a block diagram showing the transmitting-and-receiving system of Configuration 4.

In the following, a data transmitting-and-receiving system 100d in Configuration 4 will be described by focusing on the differences from the data transmitting-and-receiving system 100c described above, and a description of similarities will be omitted.

The data transmitting-and-receiving system 100d in Configuration 4 includes the stream buffer 110 and the CPU 101, which is connected to the input and output sides of the stream buffer 110.

When the CPU 101 is connected to the input and output sides of the stream buffer 110, data inputting to the stream buffer 110 and data outputting from the stream buffer 110 are performed by the CPU 101 itself. Therefore, in Configuration 4, neither the input-address converter 113 nor the output-address converter 115 is used. As a result, the components constituting the stream buffer 110 used in Configuration 4 are the input port 111, the output port 114, and the data buffer 112.

In Configuration 4, like Configuration 3, because a desired address and data to be stored at the address can be set in the CPU 101, a transfer mode option does not need to be set.

The data transmitting-and-receiving system 100*d* in Configuration 4 can achieve the same advantages as the data transmitting-and-receiving system 100*c* described above.

In particular, the data transmitting-and-receiving system 100*d* in Configuration 4 can function as a stack memory which the CPU 101 uses, by adopting the functions of option D and option E for the stream buffer 110. Furthermore, it can also function as a communication buffer between different processes in the same CPU 101.

Configuration 5

Next, a data transmitting-and-receiving system of Configuration 5 will be described.

Figure 20:
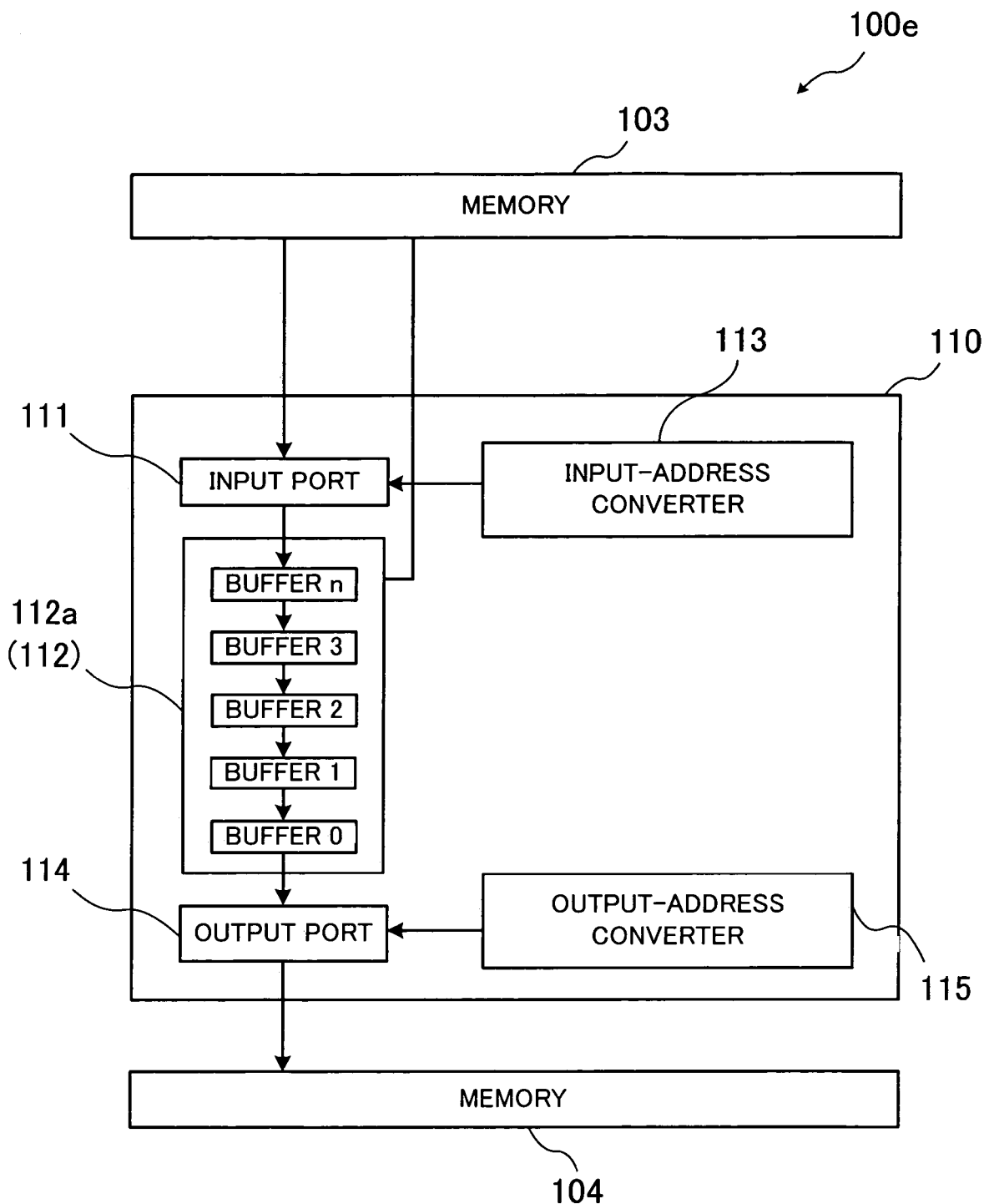
FIG. 20 is a block diagram showing a data transmitting-and-receiving system of configuration 5.

FIG. 20 is a block diagram showing the data transmitting-and-receiving system of Configuration 5.

In the following, a data transmitting-and-receiving system 100*e* of configuration 5 will be described by focusing on the differences from the data transmitting-and-receiving systems 100*a* and 100*b* described above, and a description of similarities will be omitted.

The data transmitting-and-receiving system 100*e* of Configuration 5 includes the stream buffer 110, the memory 103 provided at the input side of the stream buffer 110, and the memory 104 provided at the output side of the stream buffer 110.

When a passive unit, such as the memory 103, is connected to the input side of the stream buffer 110, the input-address converter 113 in the stream buffer 110 performs timing control (address control of the data buffer 112) of the data to be stored in the data buffer 112 and requests the memory 103 to transfer data to input the data into the stream buffer 110.

On the other hand, when a passive unit, such as the memory 104, is connected to the output side of the stream buffer 110, the output-address converter 115 in the stream buffer 110 performs address control of the data buffer 112 and performs data transfer with the memory 104 to output the data from the stream buffer 110.

Initialization of the stream buffer 110 in this Configuration is performed by providing a separate storage unit in the stream buffer 110 and loading initial-setting commands from the storage unit. Also, register setting commands may be externally input and initialization carried out based on those commands.

The data transmitting-and-receiving system 100*e* of Configuration 5 can achieve the same advantages as the data transmitting-and-receiving systems 100*a* and 100*b* described above.

Furthermore, in the data transmitting-and-receiving system 100*e*, the stream buffer 110 can provide a direct memory access (DMA) function for performing block transfer from a predetermined region in the memory to another region, without passing through a CPU.

The data transfer mode employed by the output-address converter 115 may be the same as the data transfer mode employed by the input-address converter 113, or it may be different.

Configuration 6

Next, a data transmitting-and-receiving system of Configuration 6 will be described.

Figure 21:
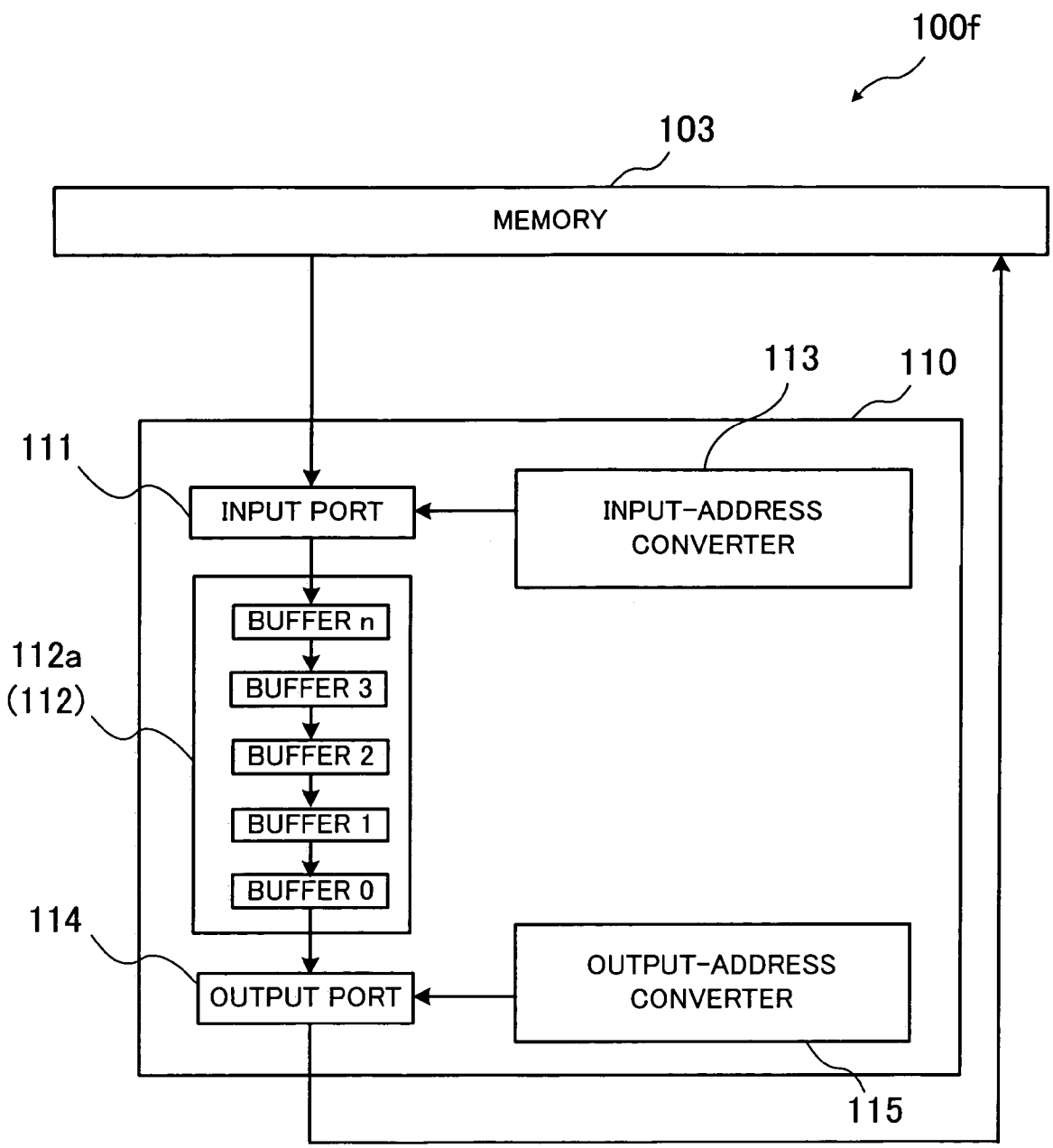
FIG. 21 is a block diagram showing a data transmitting-and-receiving system of configuration 6.

FIG. 21 is a block diagram showing the data transmitting-and-receiving system of Configuration 6.

In the following, a data transmitting-and-receiving system 100*f* of Configuration 6 will be described by focusing on the differences from the data transmitting-and-receiving system 100*e* described above, and a description of similarities will be omitted.

The data transmitting-and-receiving system 100*f* of Configuration 6 includes the stream buffer 110 and the memory 103 provided at the input and output sides of the stream buffer 110.

When the memory 103 is connected to the input and output sides of the stream buffer 110, data inputting to the stream buffer 110 and data outputting from the stream buffer 110 are performed by the input-address converter 113 and the output-address converter 115, respectively.

Therefore, the components constituting the stream buffer 110 used in Configuration 6 are the input-address converter 113, the output-address converter 115, the input port 111, the output port 114, and the data buffer 112.

This data transmitting-and-receiving system 100*f* of Configuration 6 can achieve the same advantages as the data transmitting-and-receiving system 100*e* described above.

Furthermore, in the data transmitting-and-receiving system 100*f* of Configuration 6, the stream buffer 110 can function as a transfer buffer between a plurality of memory hierarchies, for example, between a level-1 cache and the main memory, between a level-1 cache and a level-2 cache, and so on. Also, the stream buffer 110 can be used in data transfer from the local memory of a certain CPU to the local memory of another CPU.

As described above, with the data transmitting-and-receiving systems 100*a* to 100*f* (the stream buffer (memory device) 110) of the present embodiment, data transmission and reception can be reliably performed without changing the hardware configuration of the stream buffer 110, regardless of whether the CPUs 101 and 102 and the memories 103 and 104 are connected to the stream buffer 110. Accordingly, it is possible to facilitate system development.

It is also possible to realize an efficient, dedicated data bus without wastefully using up the capacity of a cache memory (that is, without occupying a part of the cache memory meaninglessly), even for data that is not reusable.

When option A is selected, because the shift register 112*a* is mainly controlled by the hardware of the stream buffer 110, it is possible to simplify the configuration of the data transmitting-and-receiving system without the data-transmission destination connected to the output side of the stream buffer 110 performing any special software control.

Furthermore, by specifying the data transfer option, data can be stored at desired addresses in the memories 103 and 104.

In addition, by setting options A to E, desired data can be stored at desired addresses in the memories 103 and 104.

Accordingly, after storing the data at those addresses in the memories 103 and 104, it is possible to omit processing for rearrangement, which is normally carried out at a later stage by separate software.

Although the memory device of the present invention has been described based on the embodiment shown in the drawings, the present invention is not limited thereto; individual components may be replaced with other components having the same functionality. Also, in the present invention, various other additional parts and processes may be included.

For example, by adopting a configuration in which an address controller for managing a memory separate from the data buffer 112, as well as addresses for that memory, is provided in the stream buffer 110 and overflow data from the data buffer 112 is temporarily saved in that memory, it is possible to realize a stack memory that is not limited to the capacity of the data buffer 112.

Furthermore, in the present invention, two or more configurations (features) described in the embodiment above may be combined.

Although a description has been given of an example in which the CPUs 101 and 102 and the memories 103 and 104 are connected to the input port 111 and the output port 114, the invention is not limited thereto. For example, I/O devices may also be connected.

The address controller 112c is provided in the data buffer 112 in the embodiment described above. However, the invention is not limited to this arrangement; the address controller 112c needs to be provided in the stream buffer 110.

According to the present invention, regardless of the data-transmission source and the data-transmission destination connected to the memory device, it is possible to reliably carry out data transmission and reception without changing the hardware configuration of the memory device. Accordingly, it is possible to facilitate system development.

Using the transmission-source address converter and the transmission-destination address converter to perform arrangement processing as required enables the elimination of separate software-based rearrangement after this processing.

The foregoing is considered as illustrative only of the principles of the present invention. Further, since numerous modifications and changes will readily occur to those skilled in the art, it is not desired to limit the invention to the exact construction and applications shown and described and accordingly, all suitable modifications and equivalents may be regarded as falling within the scope of the invention in the appended claims and their equivalents.

What is claimed is:

1. A memory device for use in transmission and reception of data, comprising:
    a data buffer for storing data output from a data-transmission source and for outputting the data to a data-transmission destination serving as an output destination of the data;
    a judgment unit for determining whether the data-transmission source output the data in response to an external command and whether the data-transmission destination receives the data in response to an external command;
    a transmission-source address converter for performing arrangement processing on the data output from the data-transmission source when it is determined that the data-transmission source outputs the data in response to the external command; and
    a transmission-destination address converter for performing arrangement processing on the data to be input to the data-transmission destination when it is determined that the data-transmission destination receives the data in response to the external command.

2. The memory device according to claim 1, wherein the data-transmission source is one of a CPU and a memory; and
    when the data-transmission source is the memory, the transmission-source address converter performs the arrangement processing.

3. The memory device according to claim 2, wherein the CPU also serves as the data-transmission destination.

4. The memory device according to claim 2, wherein the memory also serves as the data-transmission destination.

5. The memory device according to claim 1, wherein the data-transmission destination is one of a CPU and a memory; and
    when the data-transmission destination is the memory, the transmission-destination address converter performs the arrangement processing.

6. The memory device according to claim 1, wherein the arrangement processing is processing for consecutively transferring the data.

7. The memory device according to claim 1, wherein the arrangement processing is processing for transferring the data while maintaining a fixed spacing between data items of the data.

8. The memory device according to claim 1, wherein the arrangement processing is processing in which a plurality of data blocks maintaining a fixed spacing between data items of the data are formed, and each data block is transferred while maintaining a fixed spacing.

9. The memory device according to claim 1, wherein the transmission-source address converter and the transmission-destination address converter perform different arrangement processing.

10. The memory device according to claim 1, wherein the data buffer is configured to perform first-in first-out control.

11. The memory device according to claim 1, further comprising an address controller for performing sequence control of the data buffer based on a write pointer indicating a write destination address of the data in the data buffer by inputting a write signal and a read pointer indicating a read source address of the data in the data buffer by inputting a read signal.

12. The memory device according to claim 11, further comprising:
    a write-pointer generator for generating the write pointer; and
    a read-pointer generator for generating the read pointer.

* * * * *